(12) United States Patent
Feinstein et al.

(10) Patent No.: US 8,099,356 B2
(45) Date of Patent: *Jan. 17, 2012

(54) METHOD AND APPARATUS SYSTEM FOR MODELING CONSUMER CAPACITY FOR FUTURE INCREMENTAL DEBT IN CREDIT SCORING

(75) Inventors: Jeffrey Allen Feinstein, Roswell, GA (US); Gary J. Sullivan, San Francisco, CA (US); Jennifer Elizabeth Jack, San Francisco, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/027,250

(22) Filed: Feb. 6, 2008

(65) Prior Publication Data
US 2009/0037323 A1 Feb. 5, 2009

Related U.S. Application Data

(62) Division of application No. 11/832,610, filed on Aug. 1, 2007.

(51) Int. Cl.
*G06Q 40/00* (2006.01)
(52) U.S. Cl. ............... 705/38; 705/35; 705/36; 705/39; 705/42
(58) Field of Classification Search ............... 705/35–45
See application file for complete search history.

(56) References Cited

U.S. PATENT DOCUMENTS

| | | | |
|---|---|---|---|
| 6,311,169 B2 * | 10/2001 | Duhon | 705/38 |
| 6,405,173 B1 * | 6/2002 | Honarvar et al. | 705/7 |
| 7,383,215 B1 * | 6/2008 | Navarro et al. | 705/36 R |
| 2006/0233332 A1 * | 10/2006 | Toms | 379/114.2 |
| 2007/0005473 A1 * | 1/2007 | Ho et al. | 705/35 |
| 2008/0215470 A1 * | 9/2008 | Sengupta et al. | 705/35 |

OTHER PUBLICATIONS

Title: "Improving Clustering Analysis for Credit Card Accounts Classification", Book Title: "Computational Science—ICCS 2005, 5th International Conference. Proceedings, Part III", Authors: Yi Peng 1; Gang Kou 1; Yong Shi 1; Zhengxin Chen 1, pp. 548-553, Publication Date: 2005.*

* cited by examiner

*Primary Examiner* — Ella Colbert
*Assistant Examiner* — Hai Tran
(74) *Attorney, Agent, or Firm* — Mintz, Levin, Cohn, Ferris, Glovsky and Popeo, P.C.

(57) ABSTRACT

Predicting impact of future actions on subsequent creditworthiness involves developing a prediction model that predicts a statistical interaction of performance expectation with likely post-scoring behavior. Including sensitivity to new, post-scoring date credit behaviors in the analytic solution greatly improves snapshot score predictions. The modeling approach involves multiple snapshots: predictive and performance snapshots, plus an intermediate snapshot shortly after the predictive snapshot to quantify interim consumer behavior post-scoring date. Predictive interaction variables are calculated on the predictive data using simulated consumer profiles before and after assuming a sizeable simulated balance to infer the consumer's tolerance for incremental future debt. Using an adjustor approach in predicting capacity allows isolation of the confounding effect of risk from the capacity determination. A resulting capacity index can be used to rank order originations and line increases according to capacity in consumer, bankard, automobile and mortgage lending.

17 Claims, 25 Drawing Sheets

**Capacity Framework
Risk Response To *Future* Debt**

Harry, Mary and Larry – Similar FICO Score

700

| | FICO, Classic Risk Score At Scoring Date |
|---|---|
| Low Capacity | 683 |
| Medium Capacity | 683 |
| High Capacity | 683 |

FIG. 7

METHOD AND APPARATUS SYSTEM FOR MODELING CONSUMER CAPACITY FOR FUTURE INCREMENTAL DEBT IN CREDIT SCORING

CROSS-REFERENCE TO RELATED APPLICATION

This application is a divisional of U.S. Ser. No. 11/832,610, filed Aug. 1, 2007, which is incorporated herein in its entirety by this reference thereto.

BACKGROUND OF THE INVENTION

1. Technical Field

The invention generally relates to predictive model development. More particularly, the invention relates to a method and system for modeling impact of future incremental balance that are unknown at scoring date in credit quality assessments at the scoring date.

2. Background Information

In the United States, at the end of 2006, total household debt stood at approximately $12.8 trillion, including $9.7 trillion mortgage debt and $2.4 trillion credit debt. Consumer advocacy groups are concerned that credit card indebtedness and rising interest rates associated with non-traditional mortgages will continue to create strain on lower-income groups. Adding to the controversy are such factors as increasing credit card monthly minimum payment requirements which reduce consumers' cash on hand due to higher contractual debt repayment requirements; a negative savings rate, and increased ARM mortgage debt obligations when interest rates increase and/or adjustable rates reset. In combination, these factors may indicate that consumers are incurring more debt than they can comfortably handle and that the costs to maintain these debts is increasing.

Such factors lead to pressure on regulators and legislators to enact laws and regulations that govern the manner in which lenders are allowed to target consumers for additional offers of debt. As lenders continue to seek growth and higher profitability, legislation is under consideration in many locales to reduce consumer over-indebtedness. For example, in the United States, the FDIC (Federal Deposit Insurance Corporation) has expressed concern over rising interest rates and non-traditional instruments. The UK, Australia and South Africa have all enacted national laws that mandate fair and responsible lending practices.

Consumers, nevertheless, still want flexible lifestyle choices and demand the financing options to support their lifestyles. At the same time, however, even in view of the new bankruptcy law in the United States, consumers are expected to resume filing for bankruptcy in record numbers and foreclosure rates are at all time highs.

Lenders have a number of tools for evaluating an individual's debt capacity. Lenders, for example, use debt-to-income ratios in determining loan amounts or credit lines. They may calculate the current debt service plus the monthly payment for the new loan and divide the resulting value by the total monthly income. If the ratio is under a predetermined threshold, 35% for example, the lender approves the loan. Otherwise, the lender may reject the loan application or counter with a loan amount that fits the predetermined ceiling.

A drawback of the debt-to-income ratio is that it can be naïve: self-reported income is subject to exaggeration, income estimators are typically unreliable, credit-savvy consumers often have means to temporarily supplement income and different consumers have different living expenses and therefore might be able to afford more or less than 35% depending on lifestyle, family size, region of residence, and unreported sources of income/expense, e.g. alimony.

Standard modeling problems typically involve two snapshots. One is called the predictive (pred snapshot, scoring date) and is a measure of consumer credit at time 1 ($T_1$), the other is the performance (perf) snapshot and is a measure of consumer behavior at time two ($T_2$), a fixed time period following $T_1$. Typically, at $T_1$, a model is built to predict performance at time $T_2$. This is true of any standard analytic model where at $T_2$, there would be one of a variety of performances—risk, revenue, fraud, attrition, etc. This modeling approach is common not just in financial services and credit, but in insurance and other areas. Performance is generally dichotomous—representing in the credit risk scoring field, for example—"goods" and "bads." A "bad" may be a default, or a delinquency, for example; a "good" is payment as agreed. Using credit bureau data and risk scores, it is possible to paint a picture of one's credit at one time as it relates to what the picture will look like at a later time.

These models, however, only include the consumer's history at the predictive date and prior, and as such, cannot address the relative impact of debts incurred shortly after the scoring date. This is an important distinction because most uses of a predictive score are designed to make a credit decision where a change after the scoring date is particularly likely.

Typically, a lender acquires a score at a given time (aka, the scoring date) to make a lending decision or offer to a consumer at that time. In securing a score the lender desires to predict the borrower's likely performance. In attempting to predict borrower performance, the lender may rank order borrowers based on a score such as a FICO (FAIR ISMC CORPORATION, Minneapolis Minn.) score, a behavior score, some other kind of risk or revenue score in order to predict borrower risk performance or profitability. However, such "fixed snapshot" scores do not reflect likely consequences of the lenders ensuing offer, such as incurring additional debt after the scoring date.

Moreover, experience has shown that credit bureau data is considerably more reliable than consumer-supplied data for determining creditworthiness such as used in many income based measures. Lenders, therefore often use risk scores calculated from credit bureau data in evaluating creditworthiness, for example the FICO score. The FICO score predicts default risk from a credit bureau report snapshot. While the FICO score accurately assesses default risk based on static credit bureau information, it, like other "snapshot based" scores does not consider information not yet represented on credit reports, such as new debt. Additionally, while people with the same score represent the same absolute default risk, consumers within a specific risk cohort likely have different debt profiles and would consequently respond differently to the range of subsequent actions taken by themselves or their lenders after a snapshot in time.

The makeup of such different profiles represents potentially different capacities to handle future incremental debt without default, even among individuals having the same risk score. It would therefore be a great advantage for a lender to be able to obtain an improved understanding of a consumer's ability to responsibly manage future debt within risk levels when offering new or extended credit.

There exists therefore a great need in the art for a reliable way to address the industry problem of evaluating consumer capacity to handle incremental debt.

SUMMARY OF THE INVENTION

A method and apparatus for predicting impact of future actions on subsequent creditworthiness involves developing a prediction model that predicts a statistical interaction of performance expectation with likely post-scoring behavior; put differently, the model determines how overall risk differs for consumers as a function of different levels of likely incremental balance that may occur after the scoring date. Including sensitivity to new, post-scoring date credit behaviors in the analytic solution greatly improves snapshot score predictions, which include only historical information.

The modeling approach involves multiple snapshots: predictive and performance snapshots, plus an intermediate snapshot shortly after the predictive snapshot to quantify interim consumer behavior post-scoring date. Predictive interaction variables are calculated on the predictive data using a combination of "traditional" predictive variables, plus simulated consumer profiles which quantify changes in the "before value" of a variable, i.e. the value of the variable at the time of the scoring date, as a function of likely changes in the variable shortly after the scoring date and after a consumer action is likely to have occurred, such as accepting an offer, increasing balance, etc. Moreover, to assess incremental information above and beyond that of the base risk score, an adjustor approach in predicting capacity allows isolation of the confounding effect of risk from the capacity determination. A resulting capacity index can be used to rank order originations, credit line management, or other incremental/decremental debt-based decision such as consumer, bankcard, automobile, mortgage lending.

BRIEF DESCRIPTION OF THE DRAWINGS

FIG. 7 provides a table illustrating risk score distribution according to capacity in a validation data set;

DETAILED DESCRIPTION

A method and system for predicting impact of future actions on subsequent creditworthiness involves developing a prediction model that predicts a statistical interaction of performance expectation with likely post-scoring behavior. Incorporating sensitivity to new, post-scoring date credit behaviors in the analytic solution greatly improves snapshot score predictions. The modeling approach involves multiple snapshots: predictive and performance snapshots, plus an intermediate snapshot shortly after the predictive snapshot to quantify interim consumer behavior following the scoring date. In addition to traditional predictive variables, interactive predictive variables are calculated on the predictive data using simulated consumer profiles before and after assuming a sizeable simulated balance to infer the consumer's tolerance for incremental future debt. Using an adjustor approach on margin to a risk score in predicting capacity eliminates the confounding effect of risk from the capacity determination such that the Capacity Index score predicts incremental value of the capacity measure independent of baseline risk. A resulting capacity index can be used to rank order originations and line increases/decreases according to capacity in consumer, bankcard, automobile, mortgage lending, etc.

Figure 1:
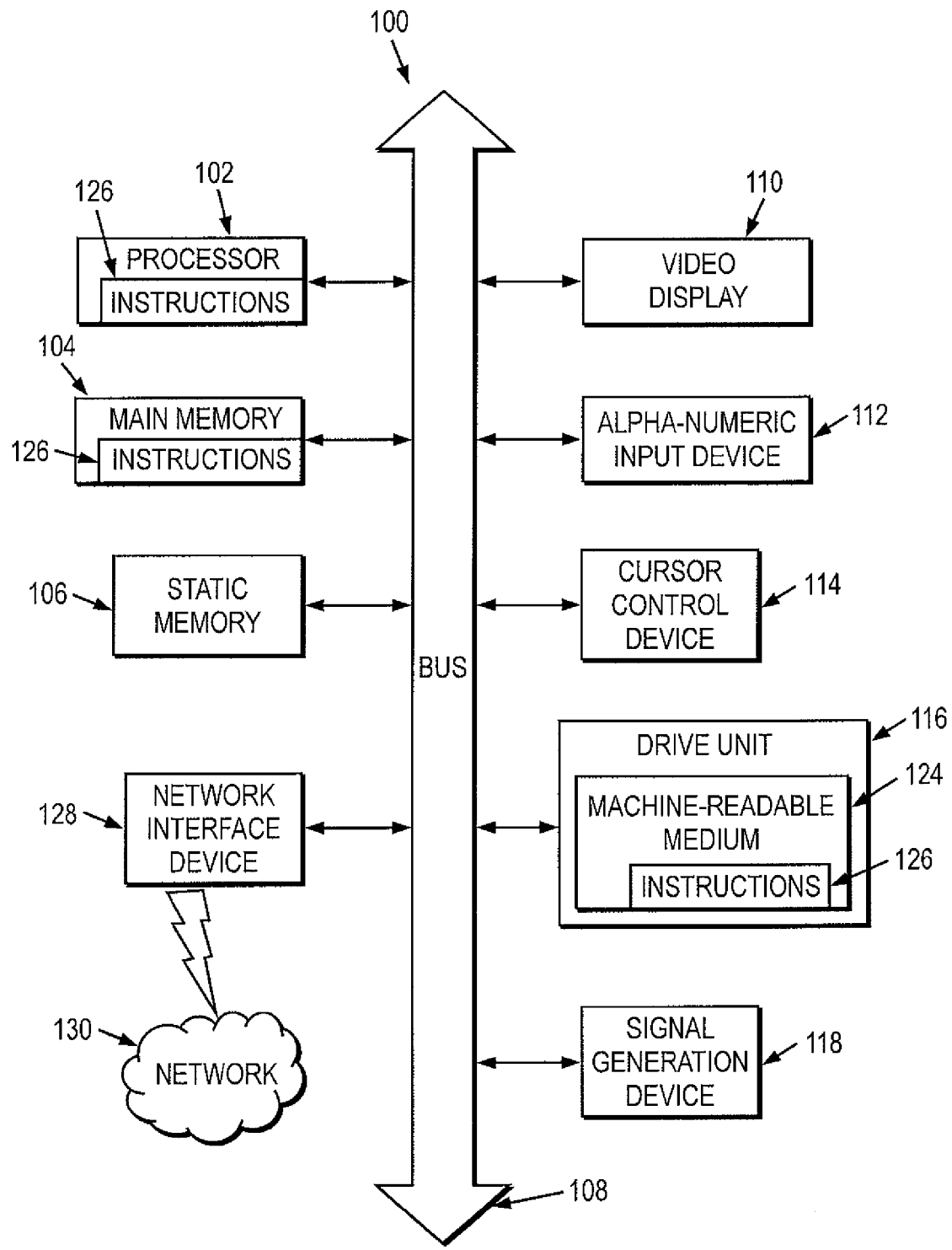
FIG. 1 is an exemplary diagram of a data processing system in which the invention may be implemented.

FIG. 1 shows a diagrammatic representation of a machine in the exemplary form of a computer system 100 within which a set of instructions, for causing the machine to perform any one of the methodologies discussed herein below, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a display unit 110, for example, a liquid crystal display (LCD) or a cathode ray tube (CRT). The computer system 100 also includes an alphanumeric input device 112, for example, a keyboard; a cursor control device 114, for example, a mouse; a disk drive unit 116, a signal generation device 118, for example, a speaker, and a network interface device 120.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 128 by means of a network interface device 120.

In contrast to the system 100 discussed above, a different embodiment of the invention uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

In the business of consumer lending, it is virtually universal practice to determine an applicant's creditworthiness before extending credit. A variety of tools are conventionally used to make this determination, among them are credit risk scores. These conventional tools have been proven effective in assessing future risk based on past credit behavior. However, a persistent question among lenders is how to assess future risk associated with new debt. A typical solution to determine how much a consumer can afford is the debt-to-income ratio, or how much a consumer currently pays in debt relative to how much income they collect. This measure has proven predictive, but flawed because debt and income are typically self-reported, and subject to bias or, when validated, do not typically include various sources of unreported income and unreported debt. Moreover, the implications for debt and income are contingent on other non-tangibles, such as lifestyle and regional cost of living variations.

Generally, a risk score is used by lenders for a specific decision, strategic offer, or other credit event. For example, when a consumer is shopping for a house, a risk score is used to determine credit-worthiness. However, when the consumer purchases the house, by definition, the action of purchasing the house changes the consumer's subsequent creditworthiness. Thus, it would be a great advantage to be able to, essentially, include the impact of the decision or the implications of potential decisions and consumer actions as part of the original score to obtain an answer to the question "What will be one's future credit risk if the individual takes the action the individual is contemplating?"

An embodiment of the invention includes a modeling approach that incorporates not only the two snapshots usually used, but a third, intermediate snapshot.

Preferably, the intermediate snapshot is used to (1) define the interaction performance variable; and to (2) validate the model using real credit change after the scoring date. In other words, the present modeling approach gathers data regarding the consumer's conduct after the scoring date and includes it in the predictive model development process, saying, in effect, that there is an interaction between the intermediate behavior, i.e. what an individual looks like in the present, and what the individual looks like later; and then endeavoring to predict this interaction directly during model development using predictive information available from the first predictive snapshot. The inventors have recognized, and provide an invention that accounts for the fact, in the present, that intermediate actions taken after the scoring date have an effect on the individual's future profile, i.e. some become riskier, some less risky as a function of the intermediate behavior.

While the invention preferably uses credit-bureau information to generate the predictive characteristics, other data aggregated across all obligations of a target entity for an individual, household, customer relationship, machine, etc. can be used; and the application of the general modeling approach is not limited to credit data and/or dimensions. Indeed, any sort of model predicting behavior that may occur in the proximal future with regard to a performance definition even further in the future can use the methodology herein described; for example, revenue, fraud, insurance claims incident, attrition, medical claims, credit terms change, etc.

Figure 2:
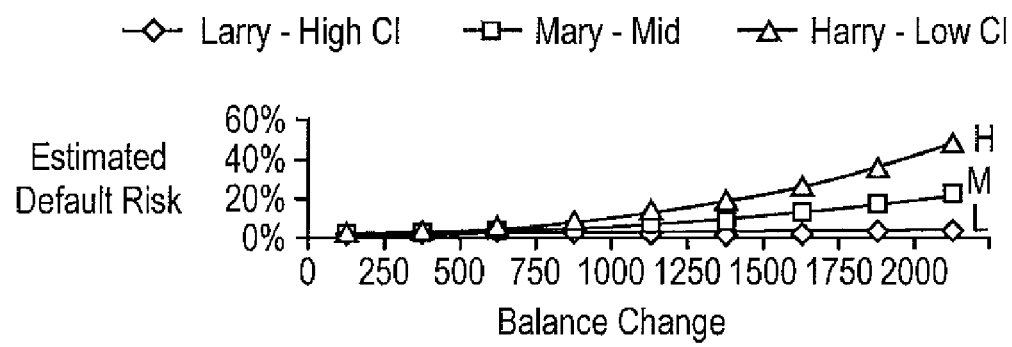
FIG. 2 provides a graph depicting the theoretical framework for the invention.

Referring now to FIG. 2, shown is a graph that depicts the theoretical framework of the invention, i.e. risk response to future debt. The graph shows the change in default risk (y axis) of three separate prototypical individuals, Harry, Mary, and Larry, relative to future balance change (x axis). These theoretical consumers have identical risk scores, in this example 680, indicating the same probability of future default under the typical implementation assumption of the FICO score or, indeed, any predictive score algorithm designed to predict the probability of a binary performance definition. Because there are multiple consumer profiles that may indicate the same default probability at a point in time, the Capacity Index algorithm drills deeper into the consumer profiles to identify finely-granulated cohorts of individuals having varying sensitivity to actions taken after the scoring date. Consequently, the ordinarily-skilled practitioner will readily appreciate from the graph that, in spite of the similarity in their risk scores, i.e. their expected default rate at a point in time, each of the three individuals is affected by additional debt in a unique way. For example, by examining the change in default rate (y-axis) as a function of incremental debt incurred after the scoring date (x-axis), it is seen that Harry's curve is nearly flat, showing that Harry's default risk is nearly unchanged as a function of taking on additional debt. In other words, Harry's capacity is relatively high.

On the other hand, Larry shows a steep upward curve as balance incrementally increases. Thus, as Larry's debt increases, his default risk increases, sharply, compared to Harry and Mary. Thus, Larry is said, within the context of the invention, to have relatively lower capacity. It is apparent that Mary's capacity is at an intermediate level.

The invention is preferably implemented in a data-processing system such as previously described supra. Thus, the inputs are received by the data-processing system and stored at particular locations in the system's memory. Stored segments of computer-readable code are executed by the processor to implement the predictive model. Values representing the inputs are read from memory by the processor and acted upon according to the executed code segments that implement the predictive model. Values representing the capacity index are routed to an I/O bus, whereupon they are output in some manner—either by display, by transmission, or printing for example.

Figure 3:
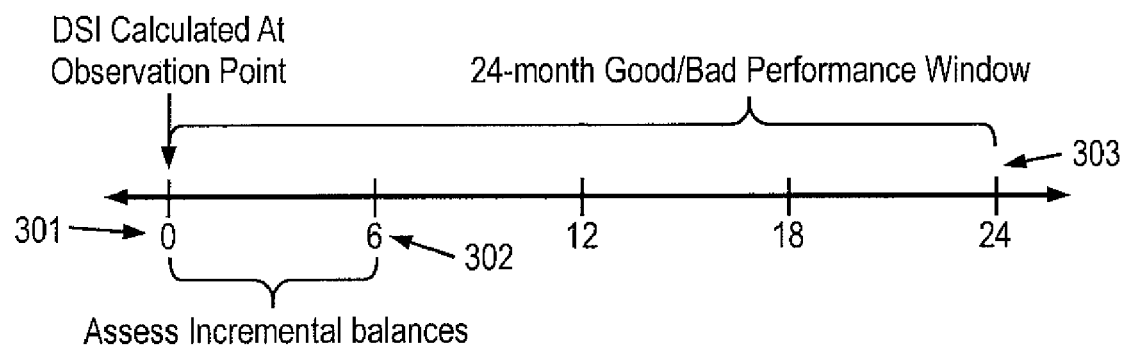
FIG. 3 provides a diagram of a three-snapshot approach to modeling impact of future actions on credit risk.

Capacity Index 300 is an instantiation of a more generic modeling technology, referred to as FUTURE ACTION IMPACT MODELING (FAIM), that uses three snapshots (see FIG. 3). The three snapshots include:

predictive information 301, gathered at the scoring date;

performance information 303, gathered at the performance date; and intermediate consumer behavior 302.

The intermediate consumer behavior is used to quantify any possible consumer actions just after the scoring date 301 for a predetermined intermediate period, for example in the case of Capacity Index, incremental balance shortly after the scoring date. This information should be measured (1) shortly after the predictive dataset to quantify behavior shortly after the predictive snapshot; (2) reasonably separated from the performance snapshot such that performance change is quantified as a function of the intermediate behavior. It is possible in some installment loan instances, additionally, for the intermediate snapshot to be the same as that of the performance snapshot if the modeling environment requires it to be so.

In one embodiment of Capacity Index, the intermediate period is determined to be six months, with performance an additional 18 months later (total of 24 months). In other embodiments, the intermediate period may extend from six to twelve months after the scoring date, with performance 12 months later, for a total of 24 months. However, the ordinarily-skilled practitioner will readily recognize that there are no technical constraints in the modeling technology regarding the time distance between the predictive and performance snapshot.

Figure 4A:
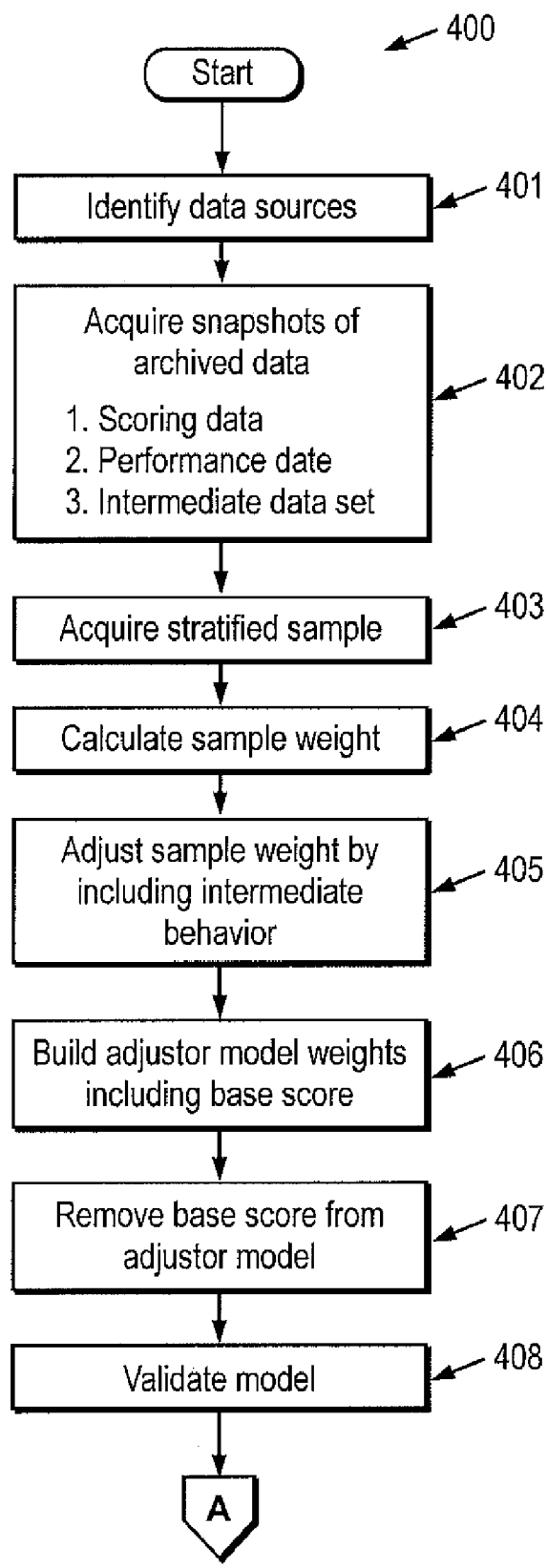
FIGS. 4a and 4b provide a flow diagram of a process for modeling impact of future actions on credit risk.
Figure 4B:
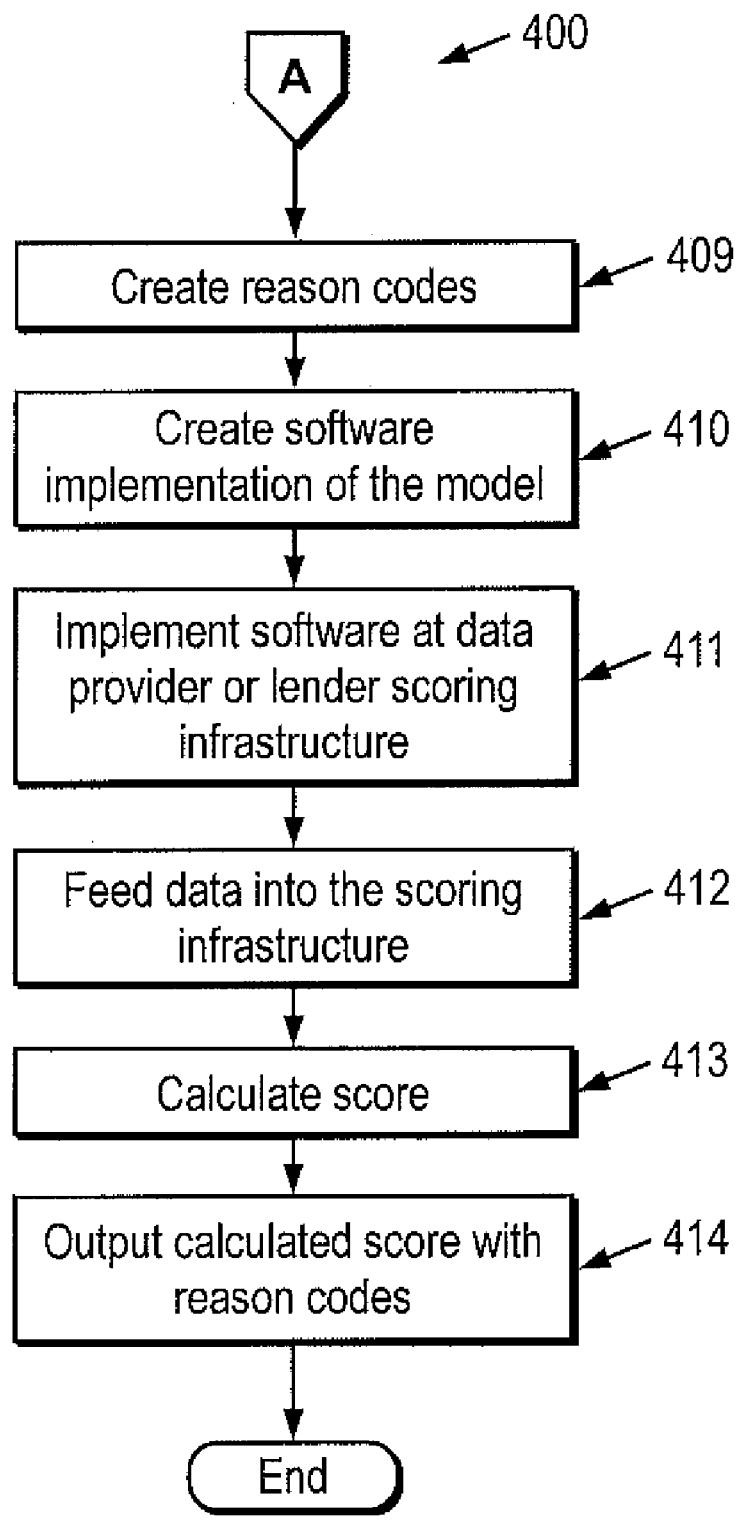

Returning to the figures, FIGS. 4a and 4b depict the above method for a standard future action impact model (FAIM) in the form of flow diagram 400. In overview, the method includes the steps of:

identifying data sources 401;
acquiring snapshots of archived data at scoring date, performance data and intermediate date 402;
acquiring a stratified sample 403;
calculating sample weight 404;
adjusting sample weight by including intermediate behavior 405;
building adjustor model weights including base score 406;
removing base score from adjustor model 407;
validating the model 408;
creating reason codes 409;
creating a software implementation of the model 410;
implementing software at data provider of lender scoring infrastructure 411;
feeding data into the scoring infrastructure 412;
calculating score 413; and
outputting calculated score with reason codes 414.

The foregoing sequence of steps and sub-processes is meant to be exemplary only. In fact, the ordering of the various steps of the method may vary considerably. Additional embodiments may include more or fewer steps than those shown in FIGS. 4a and b.

The intermediate information is incorporated into the performance definition, described herein below to calculate performance as a function of behavior at the intermediate snapshot, for example, incremental balance, as embodied in the capacity index.

Conventional dichotomous modeling techniques are not designed to model interaction between terms in the performance definition. The Capacity Index implements the interaction within a scorecard by factoring the incremental balance into a sample weight if some sort of stratified sampling occurred, or to create a sample weight based on incremental balance change if no sampling were conducted. Advantageously, the present modeling approach predicts an interaction rather than main effect performance in the traditional dichotomous modeling environment.

Interaction Performance Definition

In the invention, interaction is generally described as capturing likely performance as a function of incremental debt after the scoring date. There are many different business problems that can be operationalized in this fashion. A broad based Capacity Index can be used for these applications; or a more tailored one built on a specific at risk population could be devised. For example, the invention can be applied to incremental debt incurred by the consumer; forced incremental debt due to economic changes, regulatory changes, and/or natural disaster; contractual pricing resets, such as those associated with an adjustable rate mortgage; and consumer stresses that may increase that consumers overall indebtedness, e.g. unemployment. By using Capacity Index, a lender is in an improved position to modify lending policies in anticipation of economic downturns, for example. Additionally, the modeling approach is applicable to modeling problems posed by the economic shock of natural disasters such as hurricanes and earthquakes.

In such cases, the modeling approach is similar to that for the Capacity Index, described in greater detail infra. As of the scoring date, the historical risk profile is known. It is known that some type of change occurs at a second point in time, which can be measured in the intermediate snapshot, and that performance after that change is affected in some way.

As described above, a model is developed from observations on a sample population. The sample population is selected from a source population of accounts from, for example, a credit reporting agency such as a credit bureau. Preferably, the sample population is then weighted to produce the same number of observations as in the source population. For example, from a source population of 210 million accounts, a sample population of 1 million records may be selected. To produce 210 million observations, each of the 1 million records must be given a weight of 210, resulting in a total of 210 million observations.

A sample could be uniquely defined for certain applications as well. For example, if there is interest in building a model concerning consumer responses to increased indebtedness due to ARM resets, a sample of ARM consumers would be most appropriate for sampling. Similarly, economic based models should utilize key samples in time that mimic the economic question being modeled.

Preferably, the sample population is selected in a manner so that each performance level is represented in the sample population in the same proportion as in the source population. For example, within a source population of 210 million records, there may exist 10 million accounts with severe delinquency in the performance period, or 4.76 percent of the source population, with the remaining records classified in other performance levels, "goods," for example.

The sample population is ideally selected to also have 4.76 percent delinquents. However, within practical constraints of modeling, a population having sufficient number of delinquent accounts would have an unwieldy size of good accounts. For example, for each 10,000 delinquent accounts, the sample would need to include over 200,000 non-delinquent accounts.

To avoid this issue, the sample population is stratified. In other words, the accounts are sampled randomly in different proportions for various performance levels. For example, in the above example, to guarantee that delinquents are represented sufficiently in the sample, 500 thousand delinquents may be randomly sampled from the 10 million bankrupts in the source population. The remaining 500,000 accounts are drawn from the other performance levels. The result is a sample population of 1 million, having 50 percent delinquents. That is, the delinquents are "sampled up." Over-sampling in this way increases the raw number of counts available in relatively rare groups for a more robust development sample.

To produce a sample population whose makeup mirrors that of the source population, however, the different performance levels are weighted differently. Thus, performance levels that have been "over sampled" are "sampled down" to decrease their relative importance in the sample population. In the example given above, if is assumed, for illustration, that there are two performance levels, "delinquents" and "goods," for the makeup of the sample population to mirror that of the source population, the goods must be sampled up and the delinquents must be sampled down. Therefore, to produce a sample having 10 million delinquents, the sample of 500 thousand delinquents is given a weight of 20. For the sample population to have 200 million "goods," the sample of 500 thousand goods is given a weight of 400: 500,000 delinquents*20=10 million delinquents; and 500,000 goods*400=200 million goods.

Figure 5:
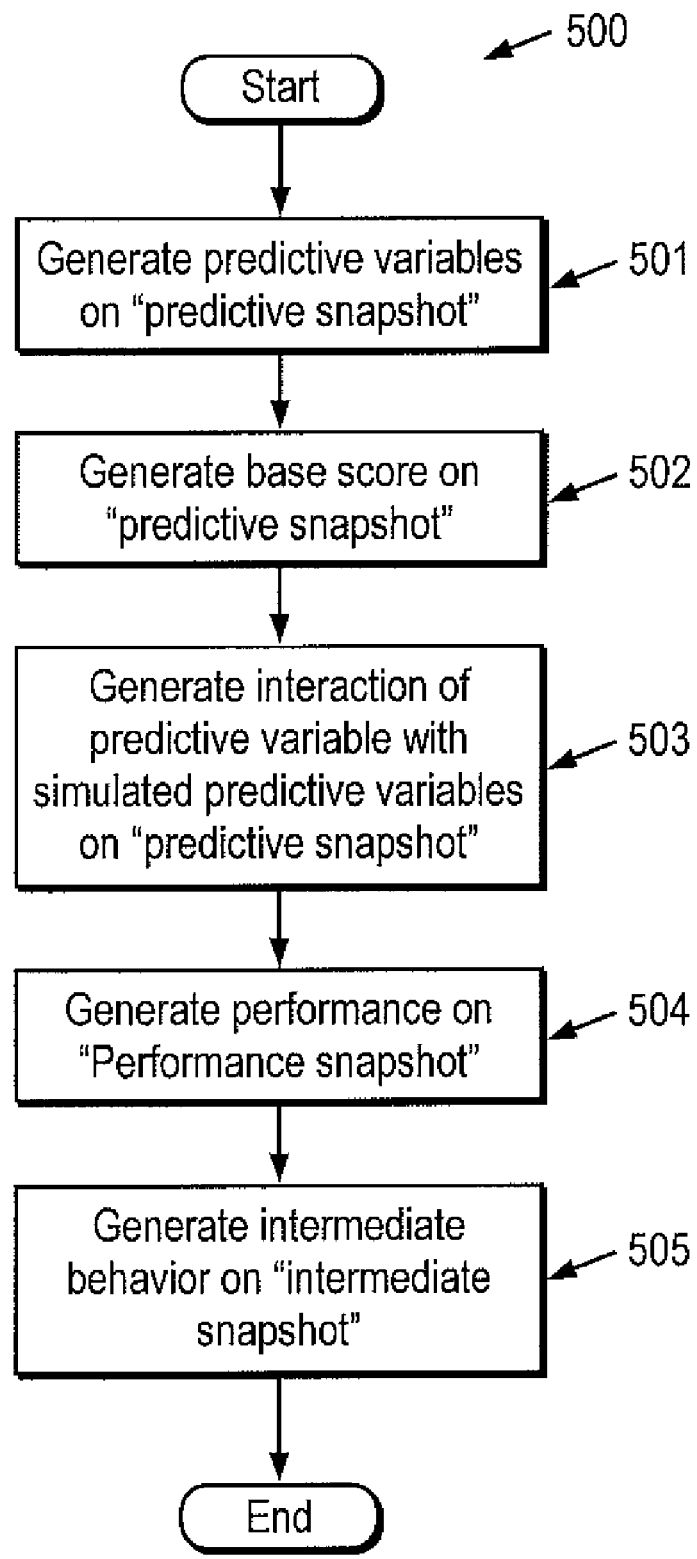
FIG. 5 provides a flow diagram of a sub-process for calculating sample weights in a stratified sample.

Referring now to FIG. 5, shown is a flow diagram of a sub-process 500 for calculating sample weights on the stratified sample. In general, the sub-process includes the steps of:
generate predictive variables on the "predictive snapshot" 501;
generate the base score on the "predictive snapshot" 502:
generate interaction of predictive variables with simulated predicted variables on "predictive snapshot" 503;
generate performance on "performance snapshot" 504; and
generate intermediate behavior in "intermediate snapshot" 505.

As explained above in relationship to FIG. 3, the presently preferred Capacity Index employs a performance window of twenty-four months, although the invention is practicable with other time spans. This time span was selected because the embodiment in question is built on margin to a credit score, such as a FICO score, that itself employs a 24-month performance window. However, other embodiments of the modeling approach may employ other performance intervals of varying length, both longer and shorter, than the example, limited only by the possibility that a performance interval of inappropriate length may degrade the model's predictive accuracy or business utility.

For each account from a sample population, at the beginning of the performance window, termed either the prediction date, or the scoring date, a first snapshot of the account is taken.

In one embodiment of the invention, which is built on margin to credit bureau data, the snapshot comprises a credit score, such as a FICO score, and the credit report. A plurality of prediction variables is extracted from the report that evaluates all areas of the credit report. Trade line, inquiry, collection and public record information are all examined. The categories of predictive variables include, for example:
previous credit performance;
current level of indebtedness;
amount of time credit has been in use;
pursuit of new credit; and
types of credit available.

Variables related to previous credit performance may include;
number of months since most recent sixty-day or higher level of delinquency was reached;
highest level of delinquency reached in the last year; and
number of months since most recent derogatory public record.

Variables related to current level of indebtedness may include, for example:
average balance on revolving trade lines;
ratio of revolving debt to total revolving limits; and
percentage outstanding on open installment loans.

Variables related to amount of time credit has been in use may include, for example:
number of accounts with at least 48 months in the file; and
length of time since the oldest revolving trade line opening.

Variables related to types of credit available may include, for example:
number of personal finance company trade lines; and
percent of trade lines that are revolving.

Variables related pursuit of new credit may include, for example:
number of recent inquiries; and
time since the most recent account opening.

While hundreds of variables could be derived from a credit report, in the development of a predictive model as described herein, a subset is identified as uniquely predictive in each application and extracted and used as predictive variables. In designing the model, selection of a particular library of characteristics is typically guided by the desired performance outcome.

A second snapshot is generated as of the performance date, the end of the performance period. Based on the second snapshot, good/bad performance for the duration of the performance period is determined. Those accounts exhibiting bad payment behavior during the performance period are classified as "bad." One embodiment of the invention defines bad performance as incurring any of a plurality of adverse events once during the performance period. Those of ordinary skill in the art will readily recognize that other performance definitions are possible. All are within the scope of the invention. Bad performance may consist of any of, for example:
bankruptcies;
charge-offs;
loan defaults;
repossessions;
serious delinquency; and
other derogatory status indicators.

Therefore, any account exhibiting one or more occurrences of any of the above adverse events is assessed as having bad performance.

There also exist certain adverse events that are classified as "indeterminate." In other words, they have neither a positive nor an adverse effect on the assessment of performance for the performance period. Indeterminate events may include, for example:
mild delinquencies;
delinquency on medical or utility trade lines only; and
isolated derogatory occurrences.

Accounts having good performance are substantially free of bad events or indeterminate events. An account may still qualify as a "good" if it exhibits a minor adverse event such as an isolated 30-day delinquency.

For each account, incremental balance incurred during the intermediate period is determined. In addition to considering risk score, predictive variables and performance, the model considers spending behavior as evidenced by incremental balance change over the duration of the intermediate period, which period is defined by the first snapshot and the third snapshot. The balance change variable could be limited to a specific industry balance, such as credit cards or total balances.

Because the sample segment of interest is that particular segment that has incremented credit balances, or, put differently, because the analytic solution is designed to rank order the effectiveness that one can handle incremental balance should they have any incremental balances, those accounts showing a lower balance or no change are classed as "indeterminate" and eliminated from consideration.

After the model is developed, it is important, however, to assess model performance for those with decreasing balance to make sure that any predicted behaviors from the model apply equally well for those who go on to increase their balances and those who go on to decrease their balance. This is important because it is unknown at the time of scoring which consumers being assessed by the score go on to increase, versus decrease, in their balance after the scoring date.

The incremental balance is used to weight each account's good/bad performance. In one embodiment of the invention, the higher the incremental balance, the greater the account is weighted. One skilled in the art will readily appreciate that weighting an account's good/bad performance based on the size of the incremental balance during the intermediate period has the effect of increasing the impact of large balance increasers in the weights optimization.

Based on the sampled weight and the performance, for each account showing an incremental balance during the intermediate period, a tag is calculated that expresses performance. Various methods of calculating such a weighted indicator value are known in the art. The incremental balance is used to modify the sampled weights, which would have the impact of multiplying the dichotomous performance measure by the incremental balance for weighted interaction performance term in a dichotomous performance model.

In one embodiment, the Capacity Index is implemented as one or more scorecards. Scorecards are a form of predictive model that is well-suited for applications involving risk assessment. Conventionally, a scorecard produces scores that "rank-order" customers according to their likelihood of exhibiting a specific behavior, from low likelihood to high. Therefore, conventionally, a scorecard models main effects: good vs. bad, high vs. low revenue, fraud vs. non-fraud, and so on. Advantageously, the invention implements a scorecard that models the statistical interaction between performance at the performance date and incremental debt as measured in the intermediate data, wherein likely performance varies by the amount of incremental debt. This interaction is operationalized as a function of modeling the performance measure directly, but including incremental debt into the sample weight such that incremental debt is multiplied by performance in the optimization algorithm.

Previously, predictive models that modeled interactions of the type described herein have been unknown in general application. A scorecard is also particularly suited to applications such as the present one because it facilitates reporting of reason codes. A scorecard model is additionally advantageous because direct score prediction allows other characteristics, such as income, behavior scores and mortgage information to add value.

Figure 6A:
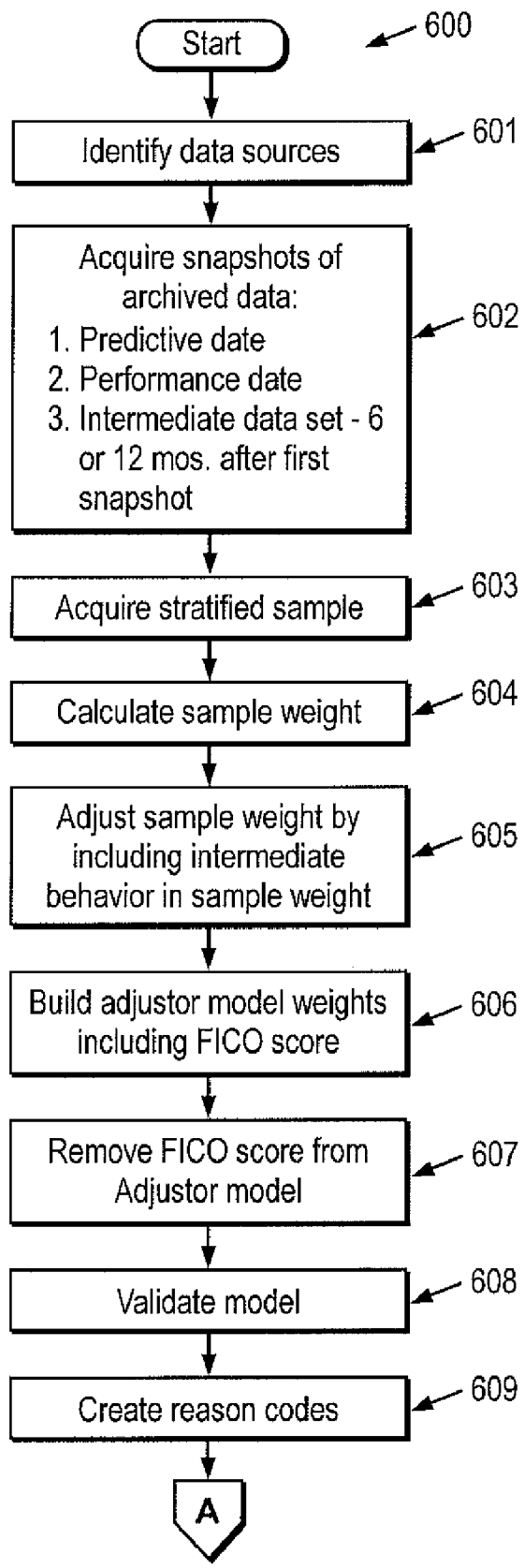
FIGS. 6a and 6b provide a flow diagram of a process for determining capacity.
Figure 6B:
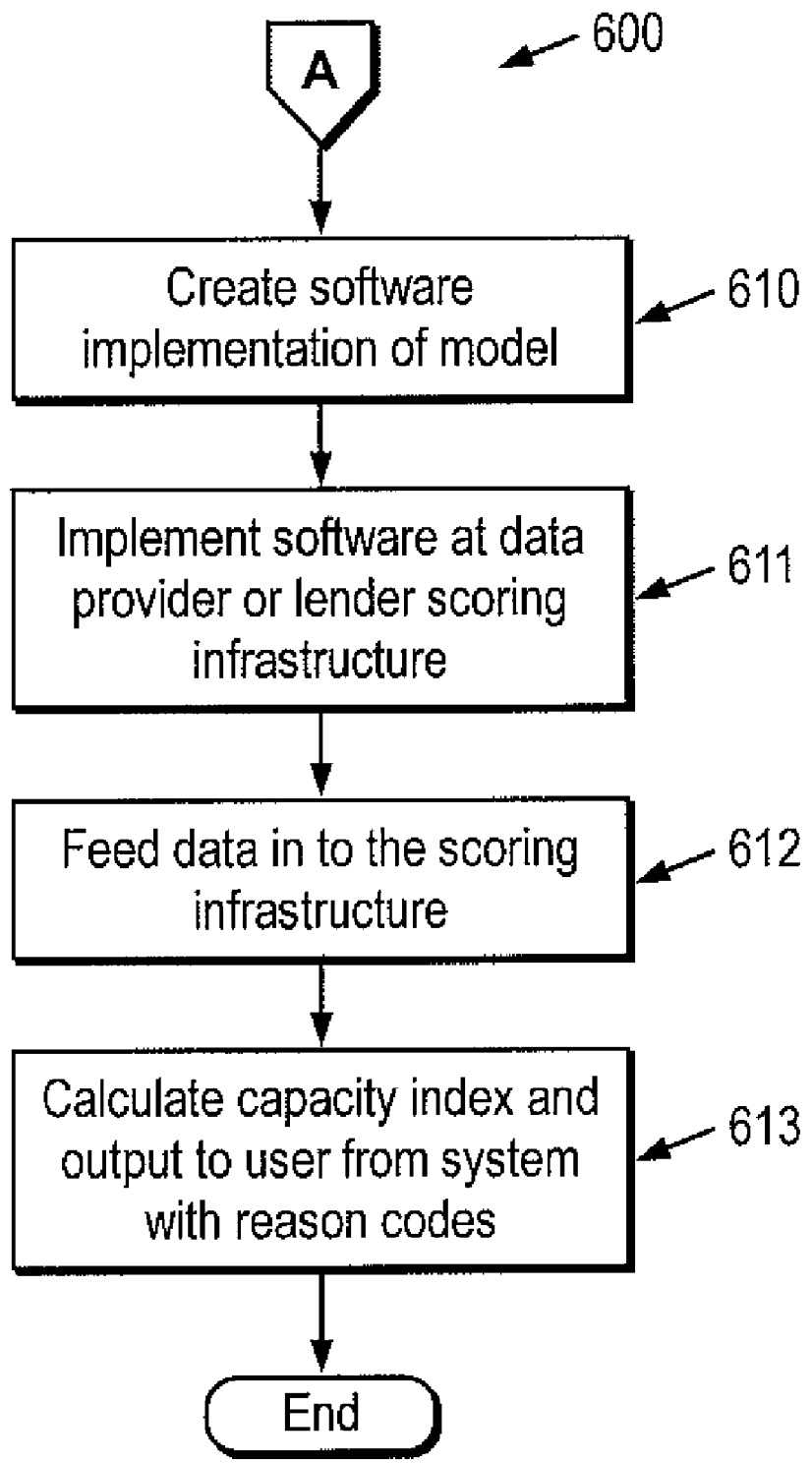

Turning now to FIGS. 6a and 6b, shown is a flow diagram of a method for determining capacity that provides an analytic solution to differentiate individuals according to capacity. The method enables development of a capacity index or score that rank orders individuals according to their capacity to assume incremental debt successfully. The method 600, based on the foregoing innovative modeling approach captures the statistical interaction between payment behavior and future incremental debt, hereinafter referred to as "performance," and incremental debt, hereinafter referred to as capacity.

Briefly, a method of determining capacity 600 includes the steps of:
  identifying data sources 601,
  acquire snapshots of archived data: predictive date, performance date, preferably 24 months following the scoring date and the intermediate data set, preferably 6 or 12 months after the predictive date 602;
  acquire a stratified sample 603;
  calculate sample weight 604, as in FIG. 5;
  adjust sample weight by including intermediate behavior in the sample weight 605;
  build adjustor model weights, for example including FICO score 606;
  remove FICO score from adjustor model 607;
  validate model 608;
  create reason codes 609;
  create software implementation of model 610;
  implement software at data provider of lender scoring infrastructure 611;
  feed data into the scoring infrastructure 612; and
  calculate capacity index and output to user from system with reason codes 613.

The foregoing sequence of steps and sub-processes is meant to be exemplary only. In fact, the ordering of the various steps of the method may vary considerably. Additional embodiments may include more or fewer steps than those shown in FIGS. 6a and 6b.

The ordinarily-skilled practitioner will appreciate that there exist a number of approaches for generating credit risk scores. One of the most widely known is the FICO score, which is designed to assess the elements of a consumer's credit report and predict the likelihood that the consumer's report shows good or bad performance in the future. There exist other credit scoring approaches from a variety of other entities such as credit data suppliers. Others will occur to the ordinarily-skilled practitioner. Any such base score can be used with the invention. Thus, the data need not be credit bureau data, and the base score could be any score that is appropriate for the data on which the capacity index is generated.

Having generated the risk score, a series of predictive characteristics are generated. Typically, the predictive characteristics are those that are found in the consumer's credit report, for example:
  the consumer's payment history, i.e. the presence and/or severity of prior delinquency;
  amounts the consumer owes on all accounts or a subset of accounts;
  duration of credit history;
  attempts to and or instances of opening new credit;
  mix of credit types, such as installment, auto, credit card, mortgage, etc.;
  File thickness, i.e. number of credit cards, trade lines.

Having gathered the data comprising the predictive variables including, for the purpose of eliminating co-variation, the credit score, the raw data itself is used to optimize a model in which predictive weights are developed that in combination represent the predictive model. The inclusion of the credit score for the purpose of eliminating co-variation is described in greater detail herein below. The ordinarily-skilled practitioner will readily understand that there exist a variety of processes by which weighting of the predictive variables may occur. One approach to weighting is to assign a weight from a numerical scale indicating representation of the sample in a population.

In one embodiment, the predictive model uses the foregoing future action impact (FAIM) modeling approach, which simulates the consumer's performance in view of additional debt incurred, for example, in response to a consumer's application for a mortgage. The predictive model described herein can predict the impact of the additional debt that the mortgage represents, if booked.

In one embodiment, capacity is defined as good/bad performance given incremental balance. As such, the interaction between simulated balance increase and performance is modeled. The interaction is modeled by multiplying the performance definition by the intermediate behavior of interest. In one embodiment of the Capacity Index, good/bad binary performance is preferably multiplied by incremental balance as quantified at the intermediate snapshot. However, non-binary performance definitions are also within the scope of the invention.

The model output comprises a capacity index that estimates the consumer's relative capacity to assume the additional debt without default. The ordinarily-skilled practitioner will understand that the capacity index preferably assumes the form of a numerical score. One embodiment of the invention uses a scale that rank orders consumers from highest to lowest according to capacity. The score is intended to be used at a fixed level of risk. Thus, one having a high capacity relative to their risk cohort has a correspondingly high index. One having a low capacity relative to their risk cohort has a correspondingly low index. Another embodiment of the invention rank orders consumers from highest to lowest according to debt sensitivity, with those having high debt sensitivity corresponding to those having low capacity and those having low debt sensitivity corresponding to those having high capacity.

Finally, a developmental data set is fed into a software modeling tool that determines the relationships among the variables and generates a predictive model that rewards good performance and penalizes bad performance such that accounts showing a high capacity are ranked higher than accounts showing low capacity.

One embodiment of the invention employs the MODEL BUILDER application (FAIR ISMC, INC., Minneapolis Minn.), a proprietary modeling tool with which one can visualize and explore predictive patterns, define predictive variables, build models, evaluate their quality and deploy them. Other modeling tools may occur to the ordinarily-skilled practitioner. All are within the scope of the invention.

After the optimized model is created, an implemented form is created. In the implemented form, installed either at the site of the data, or provided to a user of the score who has access to the data, the capacity index is generated and then reported to a requesting entity is provided, for example, to the lender who requested the consumer's credit records or the consumer himself.

An embodiment of the capacity index is reason code-compliant, as specified by statutes regulating issuance of credit, such as the Fair Credit Reporting Act (FCRA). Thus, in addition to reporting the capacity index, one or more reason codes are preferably reported. In one embodiment, up to four reason codes are returned with the capacity index. The reasons are determined from the credit score and the predictive variables in the model generating the index. The reasons chosen correspond to the variables where the difference between the maximum score for the variable and the score received by the consumer for the variable is greatest.

The ordinarily-skilled practitioner will appreciate that the above determinations closely resemble the determination of a risk score. In fact, to a degree, the performance tag calculated from the second snapshot in view of the incremental balance change incorporates a risk score. One could say that the raw performance tag rolls up a risk score and capacity determination.

One goal of the invention, however, is to determine a particular consumer's capacity for increased debt, independent of risk. To arrive at a value that is a pure expression of capacity without the confounding influence of a risk score, an embodiment of the invention employs adjustor technology. Adjustor technology includes the full resolution of a covariate into the score, builds scores including the covariate, and then allows the covariate to be statistically partialed from the score such that the remainder is the variance of the capacity prediction above and beyond that of the base score. In one embodiment, the baseline risk as measured by a FICO score is the covariate and it is statistically controlled from measures of balance sensitivity, such as capacity, using adjustor technology. This approach allows a lender to answer the question "If risk is controlled for, how balance sensitive will the consumer be?" The invention comprises a technique that recognizes that, to isolate risk from capacity, one can subtract a risk score from the raw performance tag. The remaining value is a pure expression of capacity at least partially de-correlated from risk.

The practitioner of ordinary skill will recognize that other types of predictive models are suitable for practice of the invention. All are within the scope of the invention.

Thus, it will be appreciated that when controlling for risk, high-capacity consumers are characterized by more active credit use: higher balances, older, thicker files, less delinquency, and so on. Conversely, when controlling for risk, lower capacity consumers are characterized by less credit use, lower balances, younger thinner files, more delinquency and so on. It should be noted that, while high capacity consumers have higher balances, it does not necessarily follow that those consumers with high balances have higher capacity.

EXPERIMENT I

One skilled in the art will recognize that, in the risk-scoring domain, a "bad" constitutes someone who has failed to repay their debts as promised. For one reason or another, these consumers that go on to show bad performance are unable to take responsibility for debts previously incurred. "Goods," however, includes consumers with high ability to pay. It was desired to validate the predictive model with a data set that would show whether it was possible to distinguish between "goods" and "bads" as a function of incremental balance. Experiment I involves a validation using a validation data set made up of credit bureau data provided by TRANSUNION, LLC, Chicago, Ill. The validation data set described herein involves a cohort of subjects all having a FICO score in the band of 660-<700. The score works similarly in the remaining scorebands. The particular implementation validated involved a 24-month performance window and a 6-month intermediate period during which consumer actions were tracked.

Using a predictive model as described herein above, consumer capacity was predicted at the scoring date. As of the scoring date, subsequent behavior, because, in actuality it would be unknown as of the scoring date, was not taken into account at the scoring date, however some increase credit usage within the intermediate period and others do not.

Subjects were then categorized based on behaviors captured from credit bureau data following the scoring date. The three categories were:

Did not open a bankcard;
opened a bank card with a small balance; and
opened a bank card with a large balance.
The performance definition was:
bad=90+days delinquent on any tradeline;
good=non-bad.

Referring to FIG. 7, the table 700 shows that risk remained constant across all capacity levels as measured by the FICO score.

Figure 8:
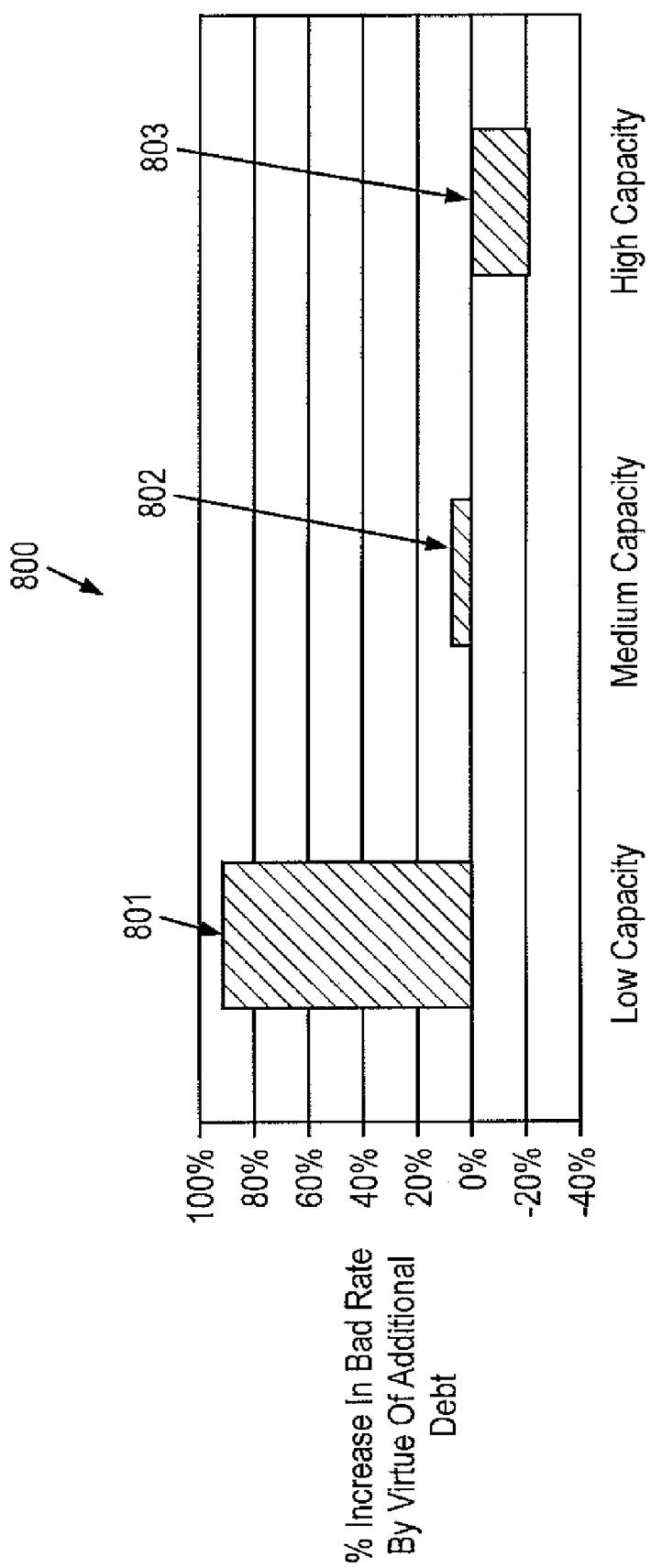
FIG. 8 provides a vertical bar chart illustrating percentage increase in bad rate by virtue of additional debt versus capacity in the validation data set of FIG. 7.

As shown in the chart 800 of FIG. 8, among subjects determined to have low capacity 801, the bad rate increased by over 90 percent as a result of opening a new card with a high balance. In sharp contrast, among high-capacity subjects 803, the bad rate decreased by 20 percent. Among medium-capacity subjects 802, the bad rate increased by 6-7 percent.

Taking a difference between the bad rate change for high and low capacity, the span between low-capacity and high-capacity subjects was 110 percentage points; the span between low- and medium-capacity subjects was 83-84 percentage points; and the span between medium- and high-capacity subjects was 27 percentage points. As such, the validation data set clearly shows there was little or no increase, and possibly a decrease in bad rate among high-capacity subjects, while the bad rate almost doubled in low-capacity subjects. In medium capacity subjects, there was a slight but significant increase in bad rate.

Figure 9:
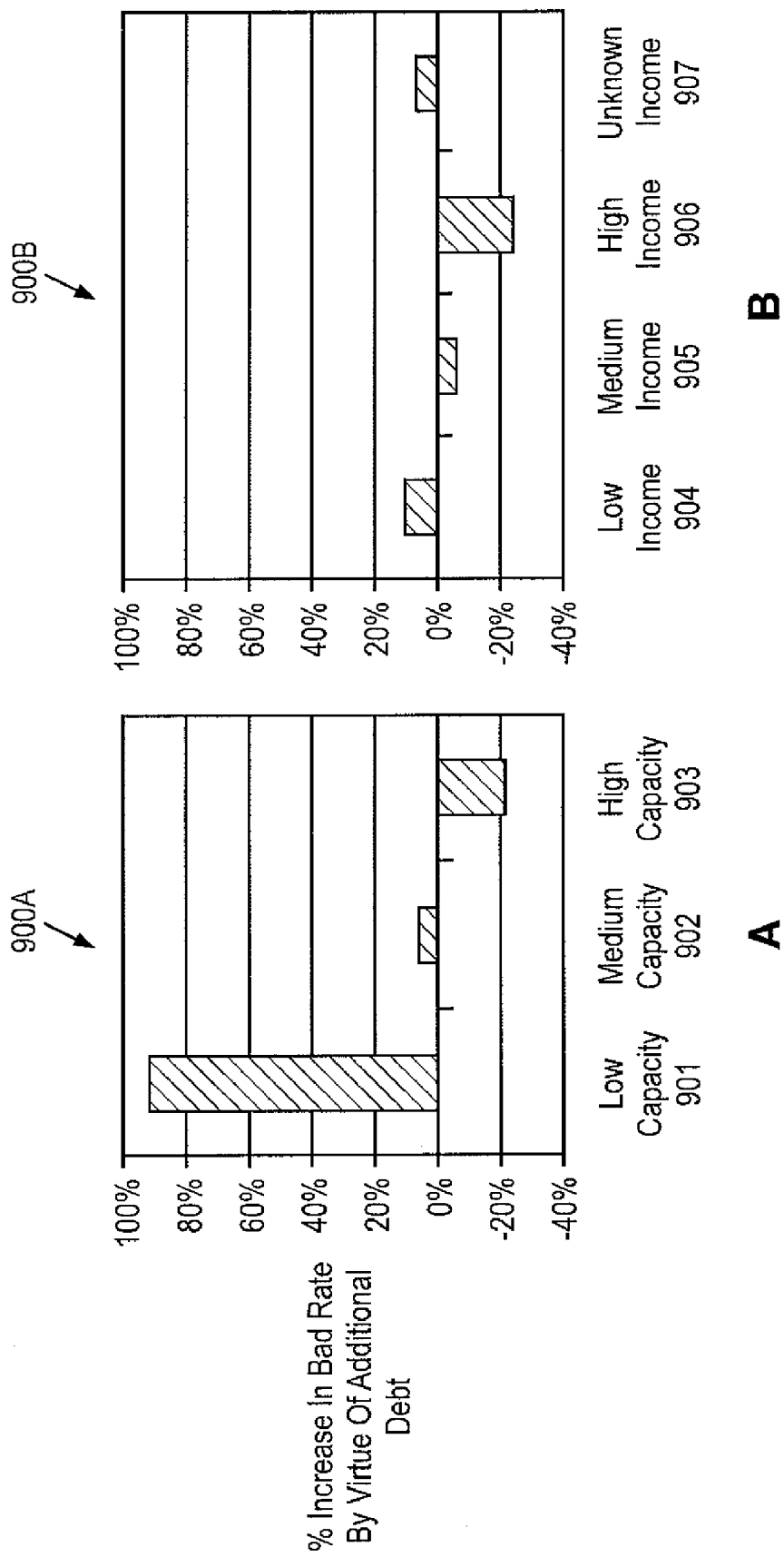
FIGS. 9a and 9b provide bar charts that graph percentage increase in bad rate by virtue of additional debt versus credit and income, respectively in the validation data set of FIG. 8

FIG. 9 compares the accuracy with which the capacity index identifies consumers for whom an increase in debt burden increases their default rate versus the accuracy for income data, such as debt-to-income ratios. The chart 900a of FIG. 9A depicts the same data as that of FIG. 8. The chart 900b of FIG. 9B depicts increase in bad rate as a function of reported income. While high income 906 appears to relate nearly as closely to the percentage increase in bad rate by virtue of additional debt, that is, those who report a high income also handle increased debt successfully; low reported income does not relate nearly as closely to an increase in bad rate as low-capacity does. Those reporting low income showed only a 10 percent increase in bad rate, as opposed to an increase in bad rate of over 90 percent for low-capacity subjects. Thus, the data show that low income is only weakly correlated with demonstrated capacity. There are, therefore a significant number of low-income individuals who may, in fact, be medium- or even high-capacity.

FIG. 9B also reveals that there exist a number of subjects for whom income is unknown 907 and that a small but insignificant increase in bad rate was shown for this group. The existence of this fourth group of subjects 907 illustrates a further strength of the capacity index. The capacity index uses verified data to rank orders consumers according to their predicted ability to successfully handle an increase in debt, without relying on income data. The group of subjects for whom no income data is available represent a group about which it is difficult to make predictions regarding the ability to handle increased debt successfully.

EXPERIMENT II

Figure 10:
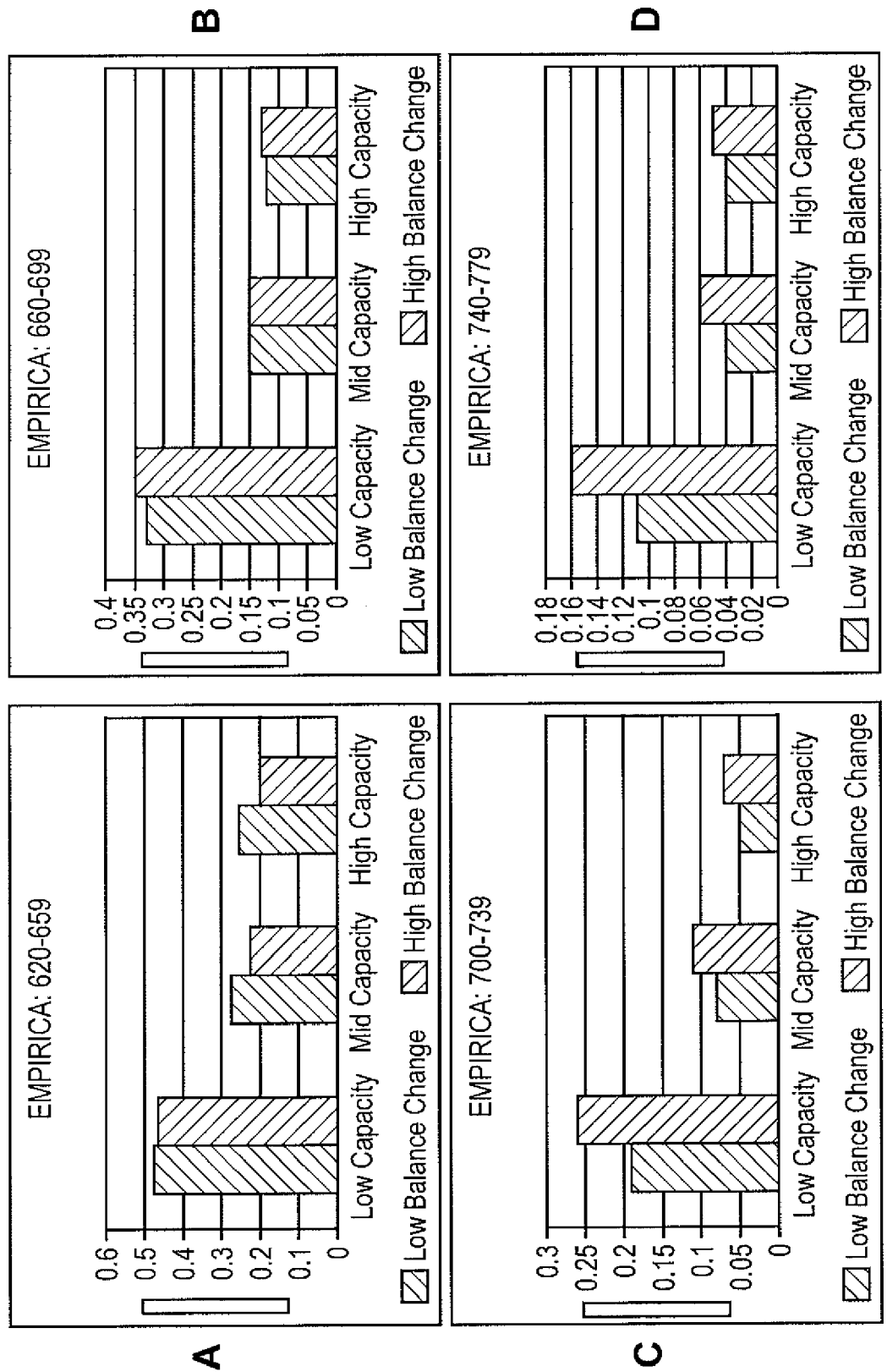
FIGS. 10a-10d provide a series of bar charts that graph performance versus balance for from a validation data set.

FIGS. 10A-D provide a series of bar charts depicting performance vs. balance change for four segments, risk score=620-659 (FIG. 10A), 660-699 (FIG. 10B), 700-739 (FIG. 10C) and 740-700 (FIG. 10D). The present validation data set comprises credit bureau data regarding management of revolving credit card accounts. As shown in FIG. 10A, within each segment, as capacity increases, the "bad" rate decreases. Additionally, across segments, the "bad" rate decreases from one segment to the next, each segment corresponding to a higher FICO segment. Somewhat anomalously, in FIG. 10A, the bad rate for mid-level- and high-capacity exhibit a higher "bad" rate for low balances than for high balances. As in validation data set I, such anomaly may be explained by the riskiness of the entire segment, no matter what the capacity index (CI) is. For all other groups in the remaining segments, with the expectation of the mid-level capacity index (CI) in FIG. 10B, the "bad" rate is lower for low balances vs. high balances.

Capacity Index in Practice

Figure 11:
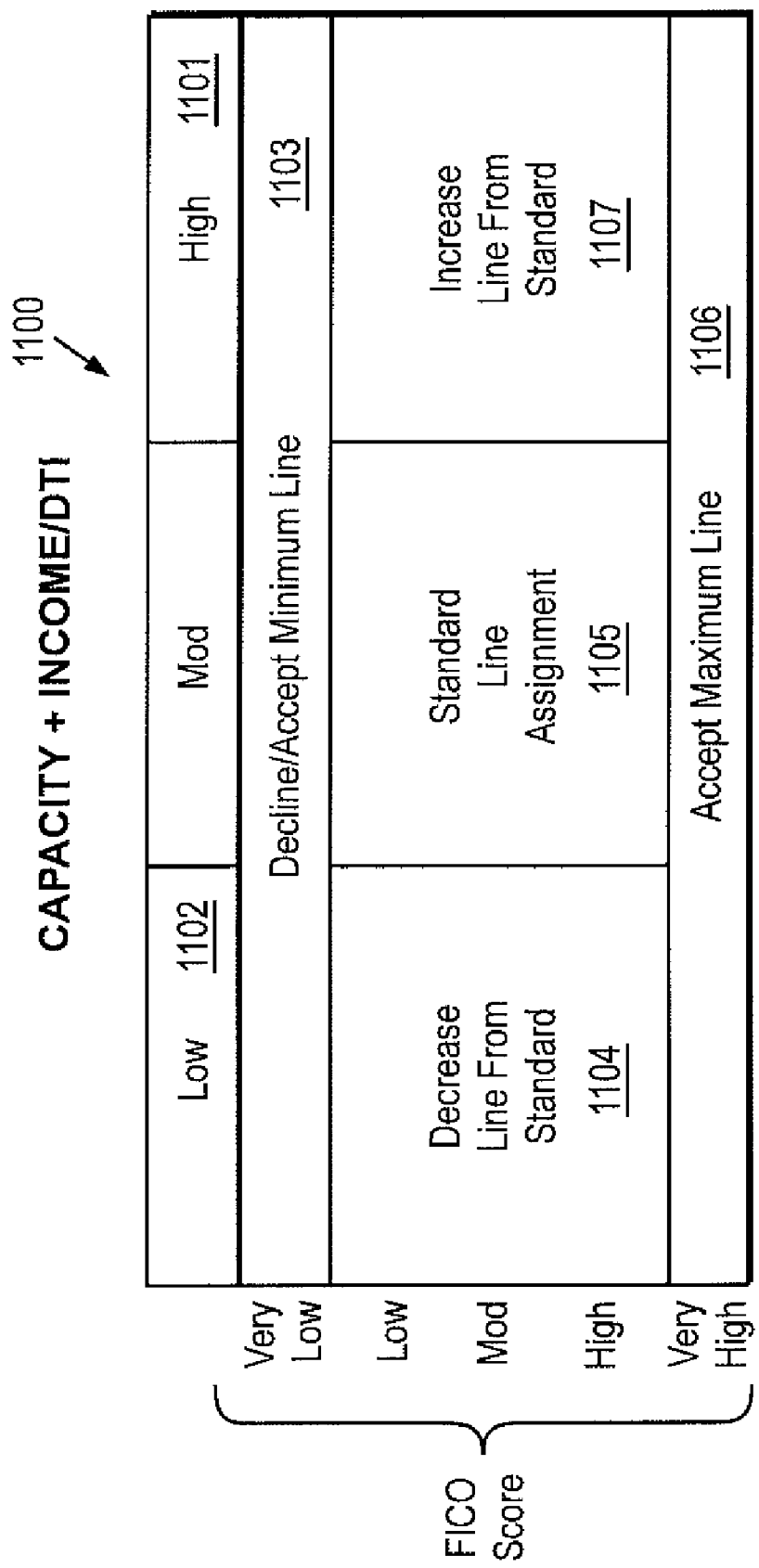
FIG. 11 provides a chart illustrating implementation of a service that incorporates capacity index.

FIG. 11 provides a chart describing a practical implementation 1100 of the capacity index (CI) that uses the capacity index on margin to a strategy using a risk score such as the FICO score, for example and income for an initial credit line decision:

target consumers with high capacity 1101 for higher initial credit lines; and
target consumers with lower capacity 1102 for lower initial credit lines.

Additional elements of the strategy include:
for those with a very low FICO score, the strategy is to decline or assign only a minimum line no matter what CI is 1103;
for those with a very high FICO score, assign the maximum line no matter what the CI is 1106;
for those with low-to-high FICO scores, if CI is low, decrease the credit line assigned 1104;
for those with low-to-high FICO scores, if CI is moderate, assign the standard line 1105; and
for those with low-to-high FICO scores, if CI is high, increase the standard line 1107.

Adding capacity index on top of existing measures provides new information not captured by these other elements. The additional information helps to determine target offers and initial line assignments, particularly around gray areas near existing cutoff zones. Those with mid-level FICO, missing income, or other gray areas can be assigned either higher or lower lines depending on capacity.

Figure 12:
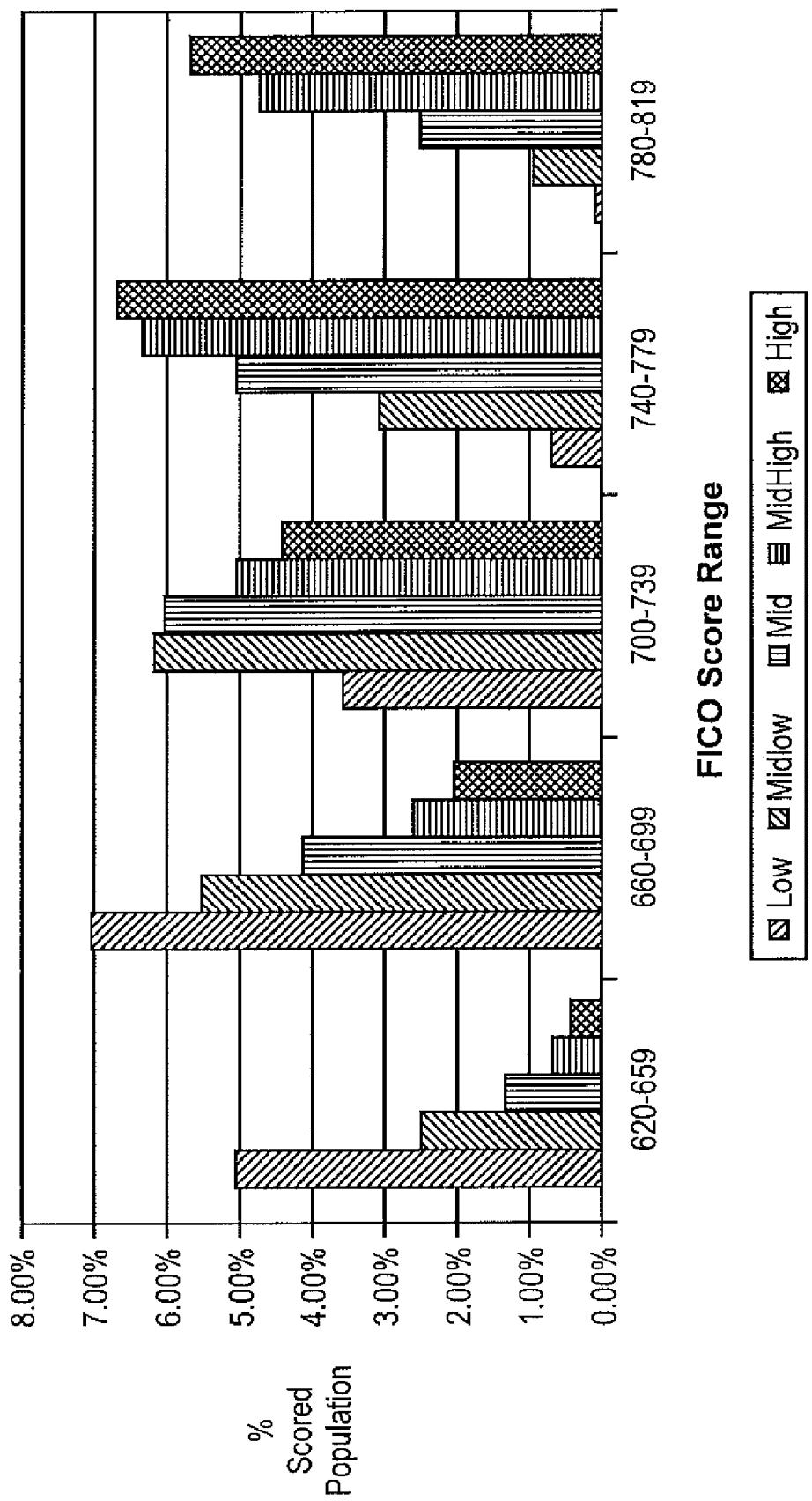
FIG. 12 is a graph showing capacity index distribution, in which it is shown that there is a small correlation with risk, such that any capacity level can be found at any risk level.
Figure 13:
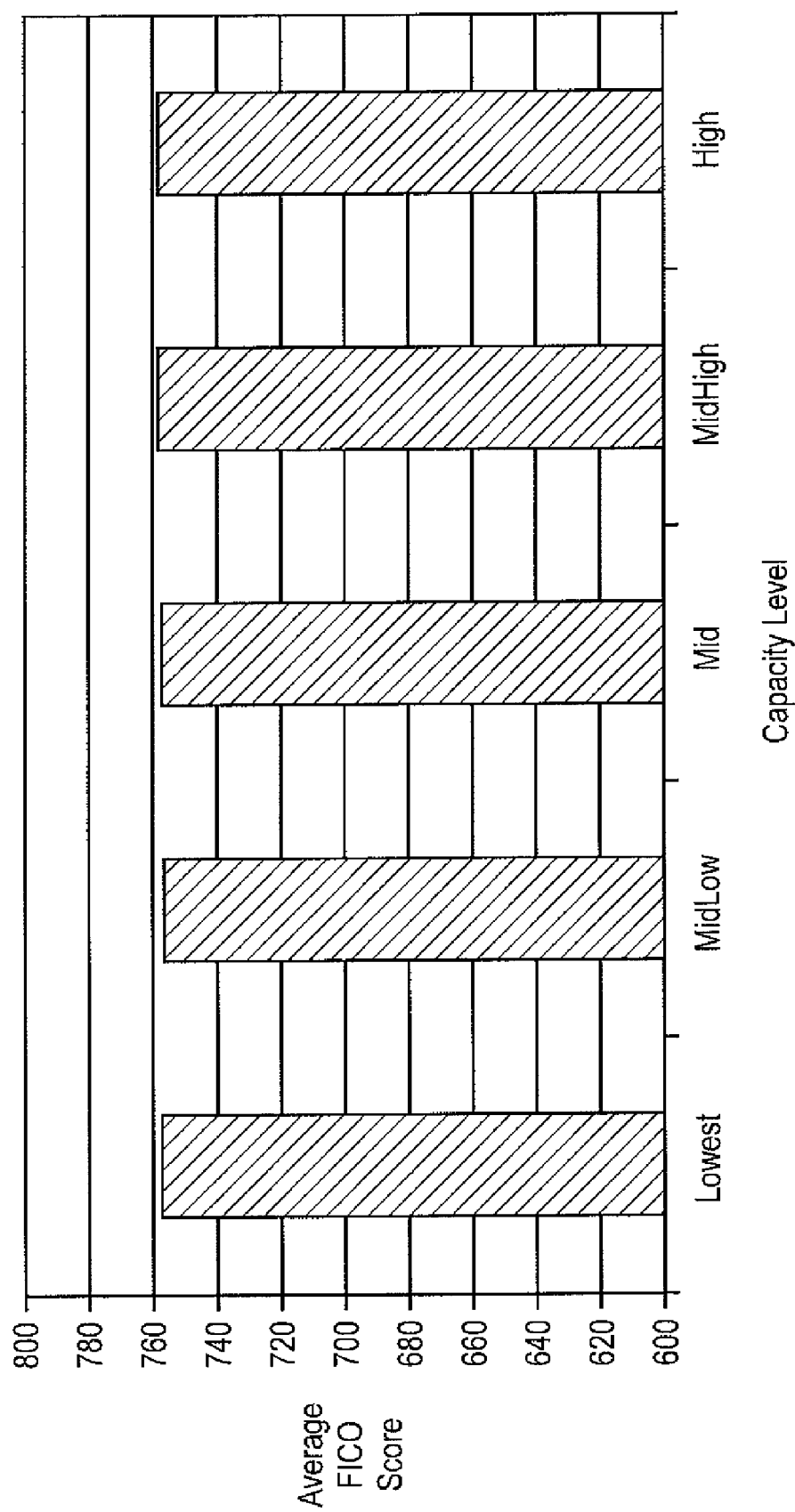
FIG. 13 is a graph showing the differences in FICO score do not account for relationships.
Figure 14:
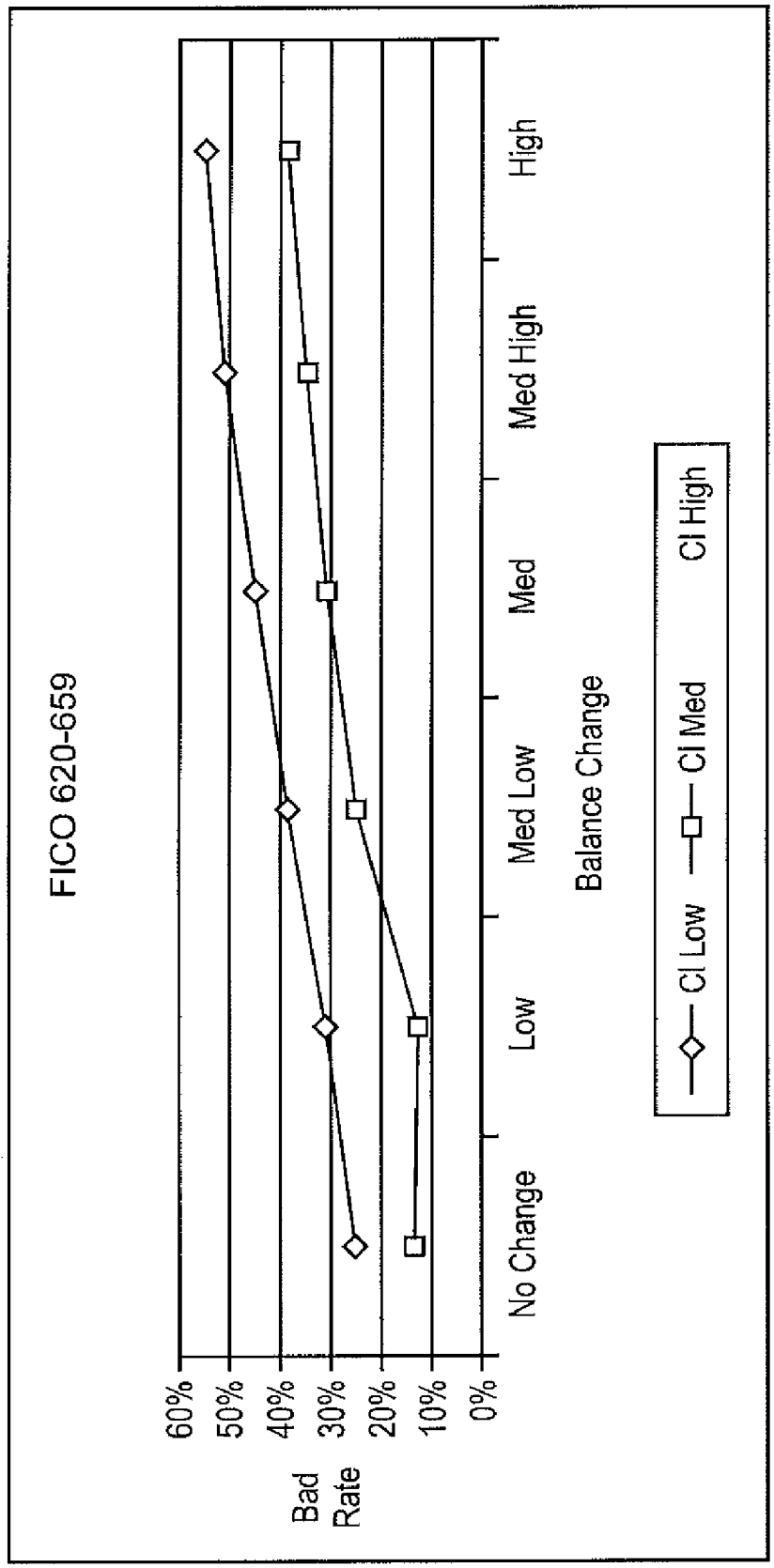
FIG. 14 is a graph showing risk effect between high and low balance changes for low FICO scores.
Figure 15:
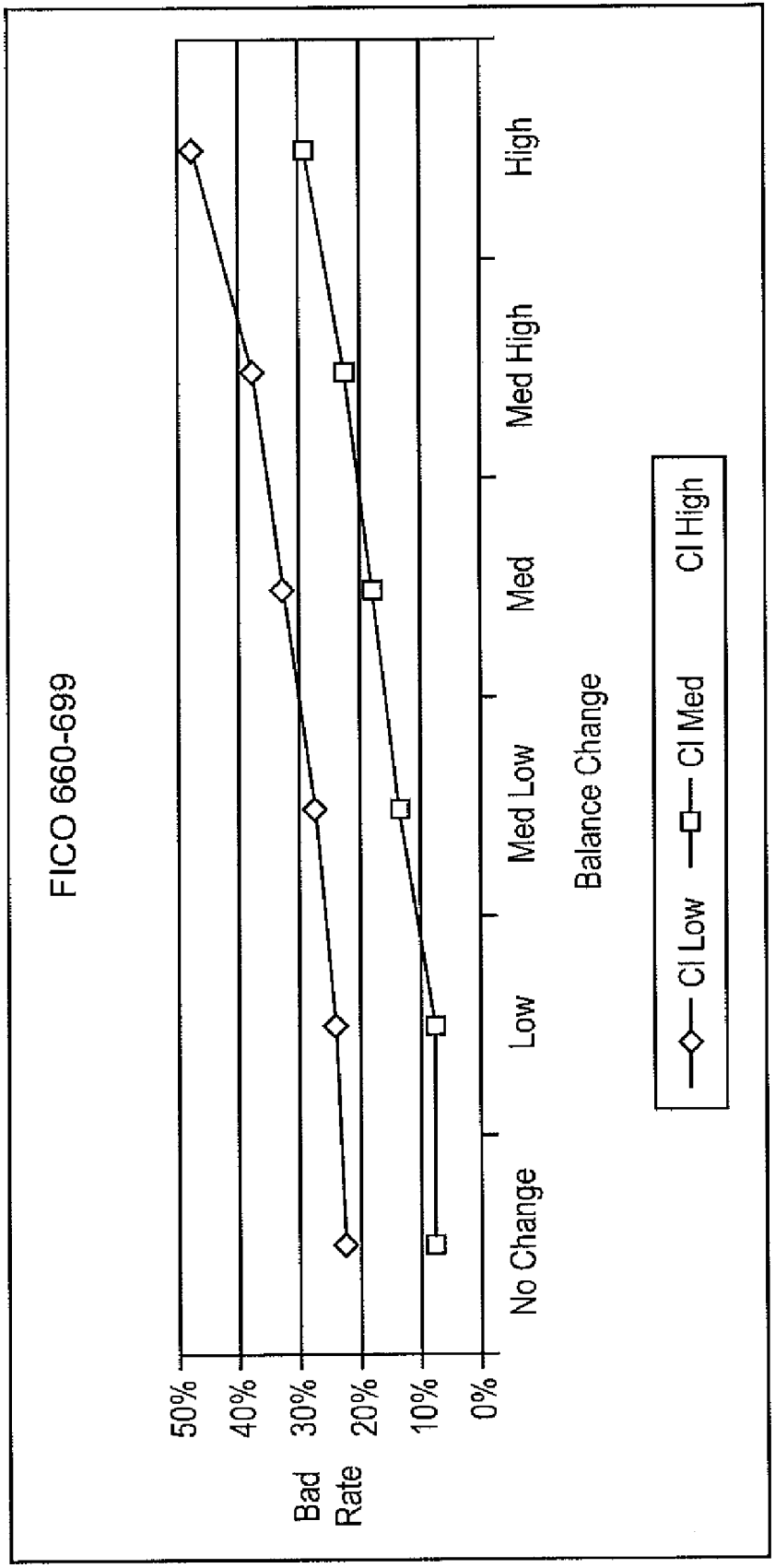
FIG. 15 is a graph showing risk effect between high and low balance changes for midlow FICO scores.
Figure 16:
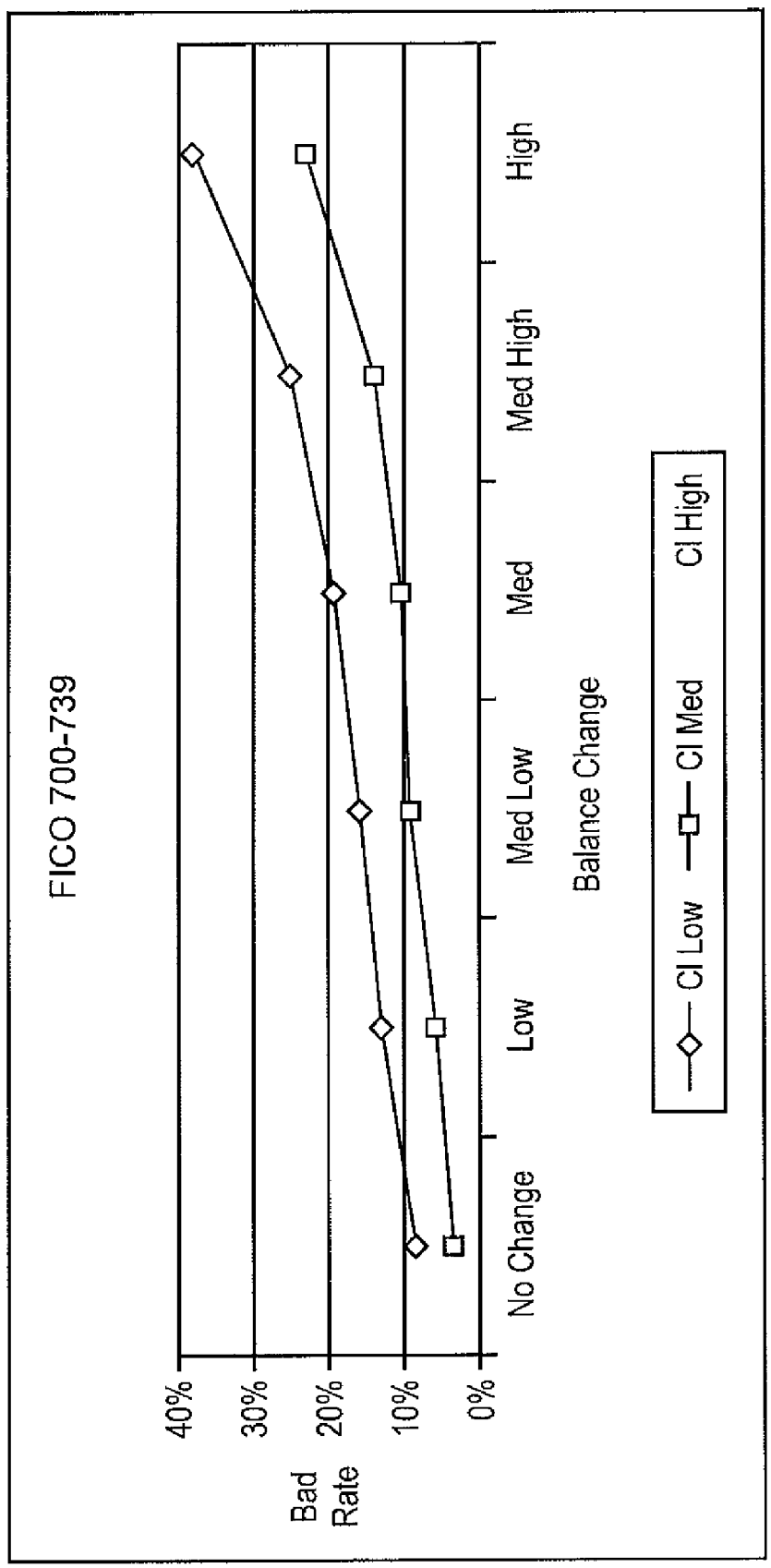
FIG. 16 is a graph showing risk effect between high and low balance changes for mid FICO scores.
Figure 17:
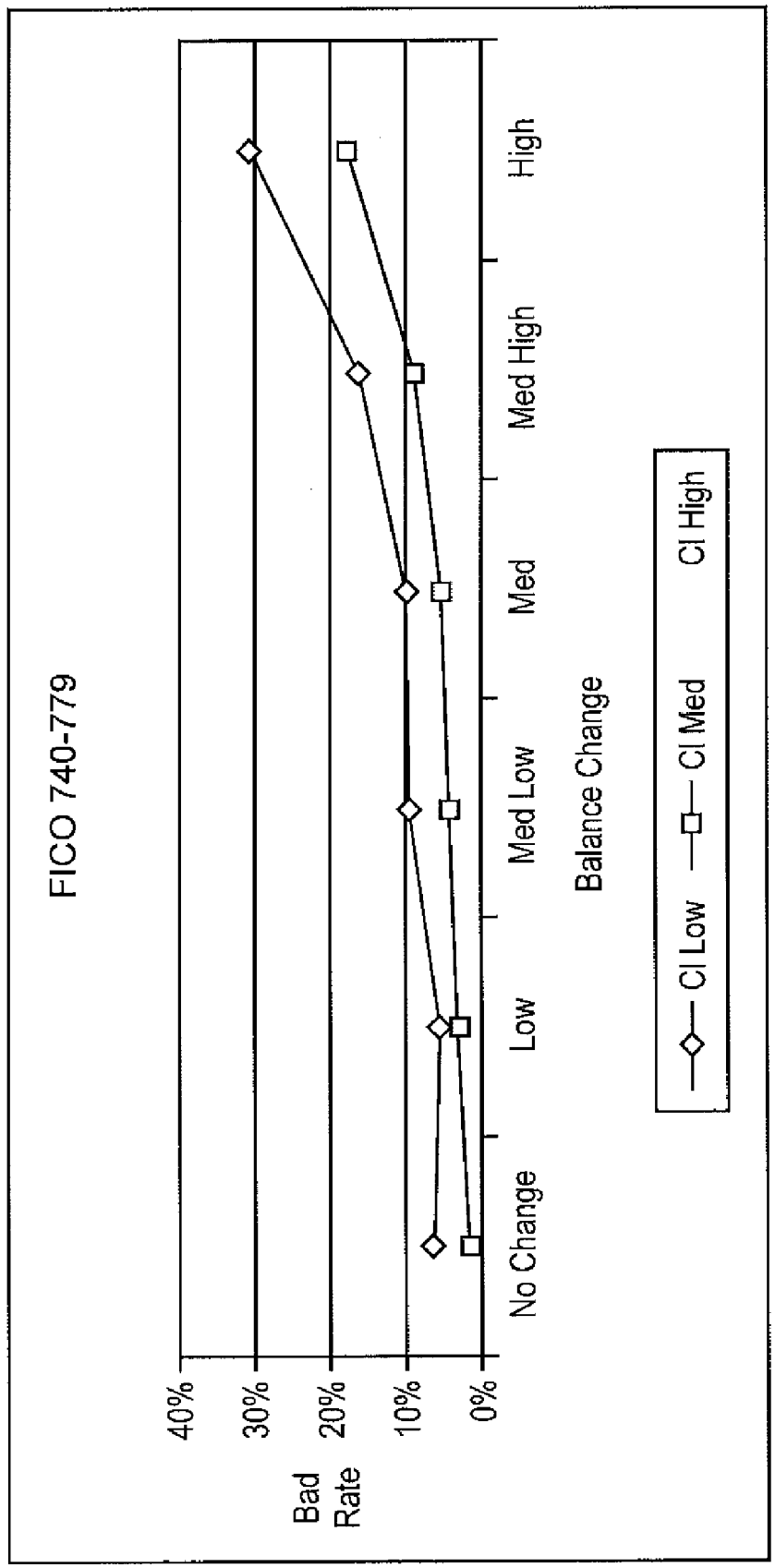
FIG. 17 is a graph showing risk effect between high and low balance changes for midhigh FICO scores.
Figure 18:
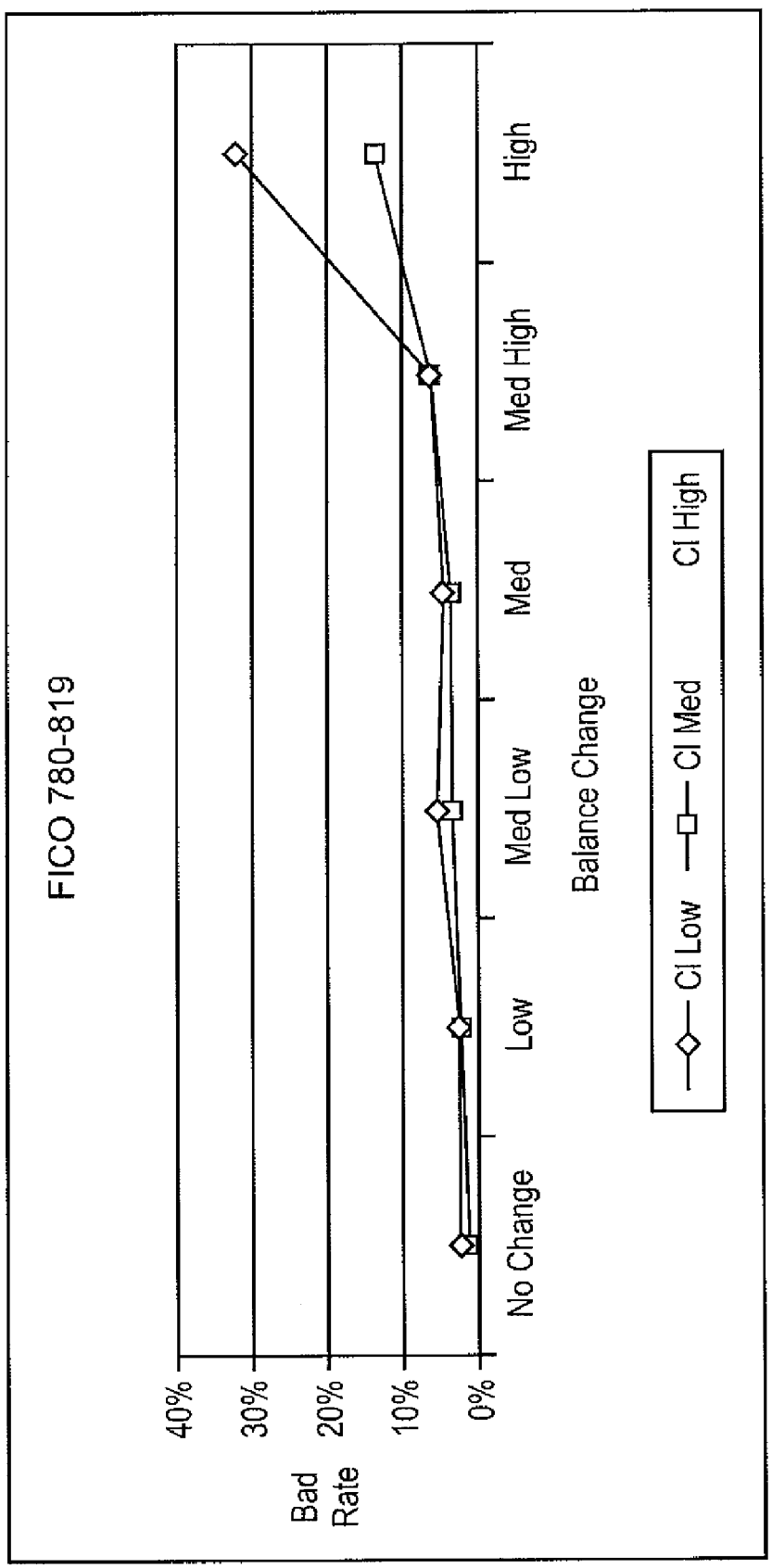
FIG. 18 is a graph showing risk effect between high and low balance changes for high FICO scores.

Some results obtained with the use of the herein disclosed capacity index are shown in the following figures, where:

FIG. 12 is a graph showing capacity index distribution, in which it is shown that there is a small correlation with risk, such that any capacity level can be found at any risk level; FIG. 13 is a graph showing the differences in FICO score do not account for relationships; FIG. 14 is a graph showing risk effect between high and low balance changes for low FICO scores; FIG. 15 is a graph showing risk effect between high and low balance changes for midlow FICO scores; FIG. 16 is a graph showing risk effect between high and low balance changes for mid FICO scores; and FIG. 17 is a graph showing risk effect between high and low balance changes for midhigh FICO scores. FIG. 18 is a graph showing risk effect between high and low balance changes for high FICO scores.

Figure 19:
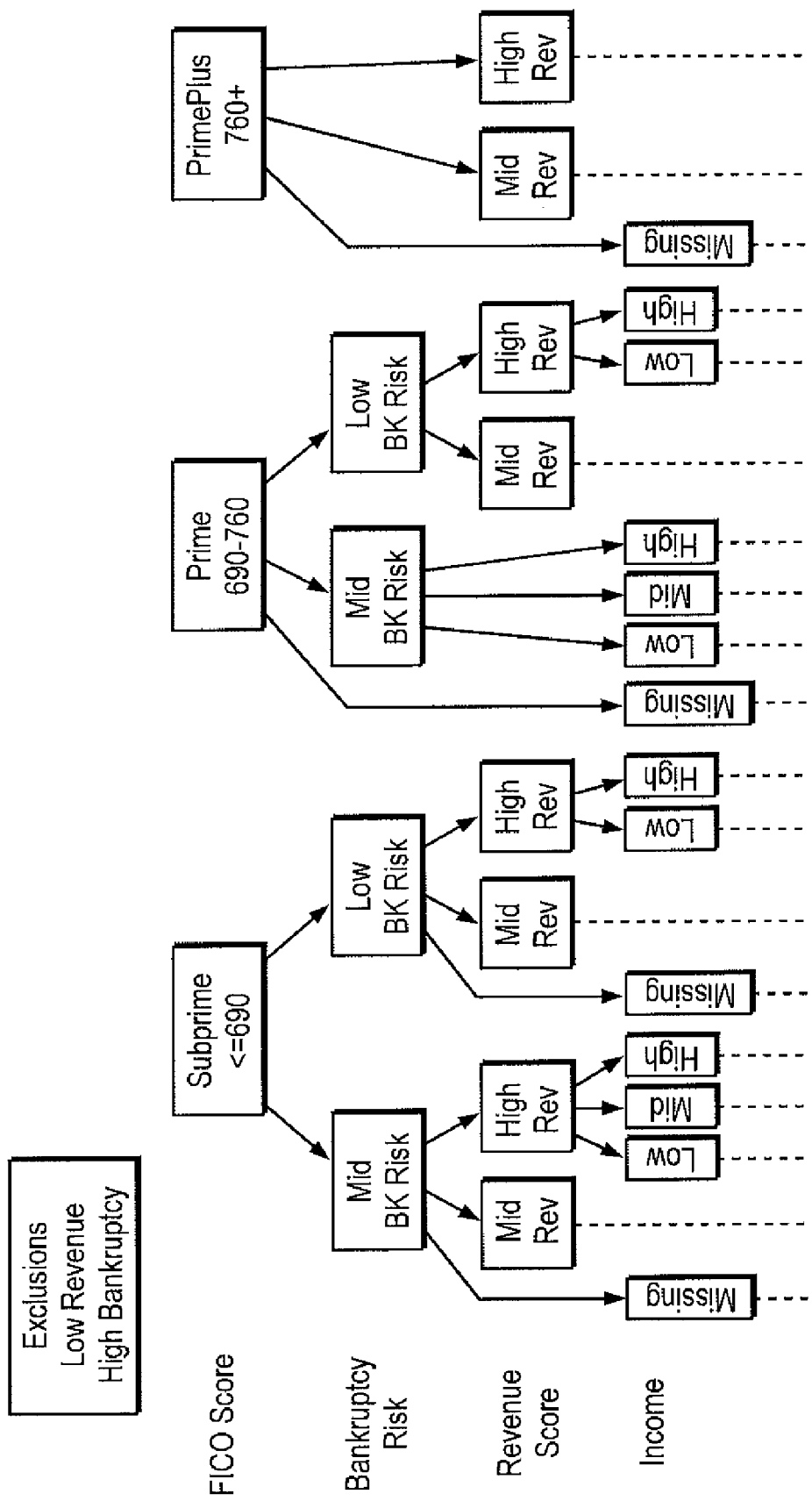
FIG. 19 is a block schematic diagram showing a multi-score strategy using the capacity index.
Figure 20:
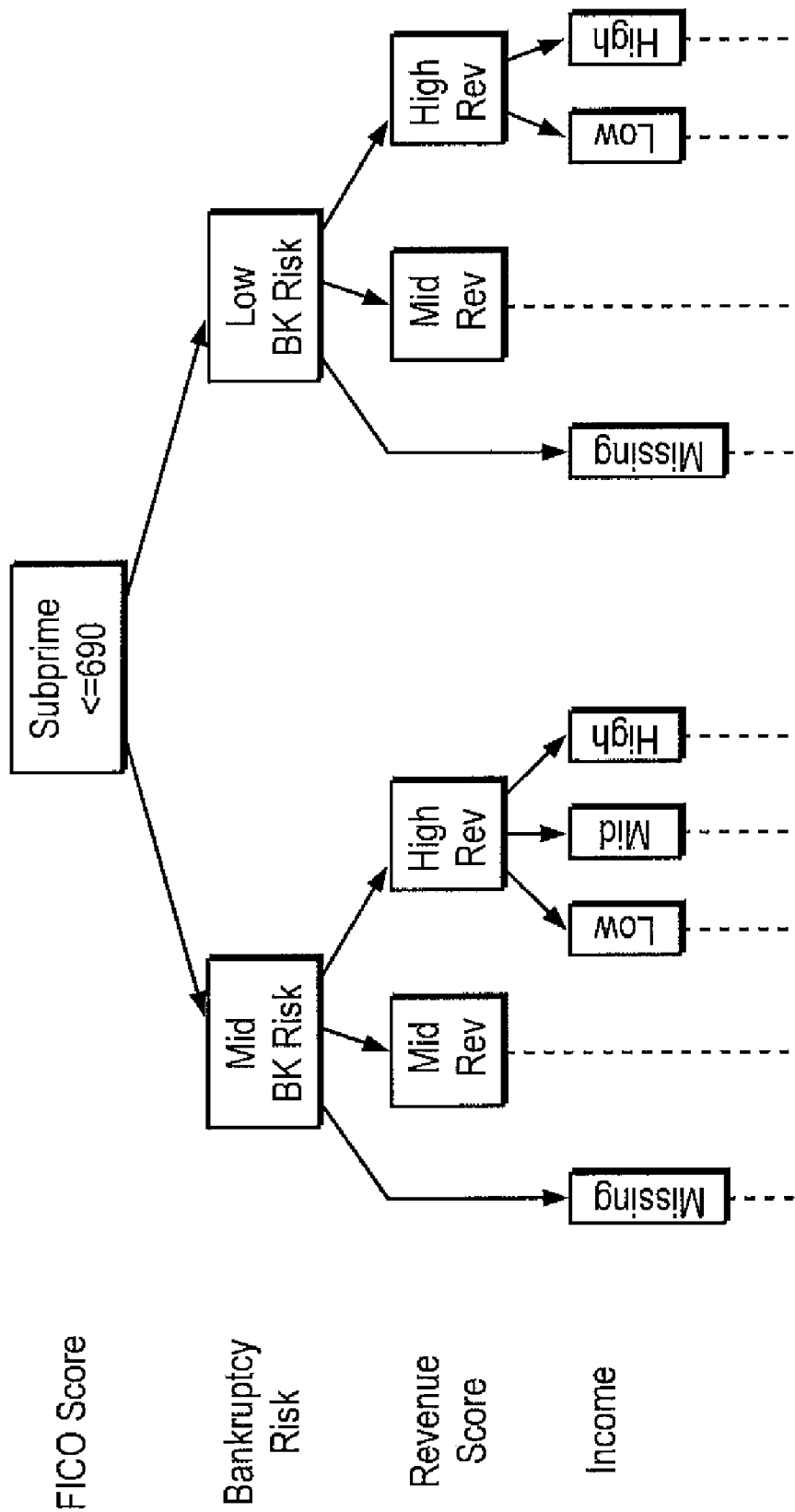
FIG. 20 is a block schematic diagram showing a multi-score, subprime strategy using the capacity index.
Figure 21:
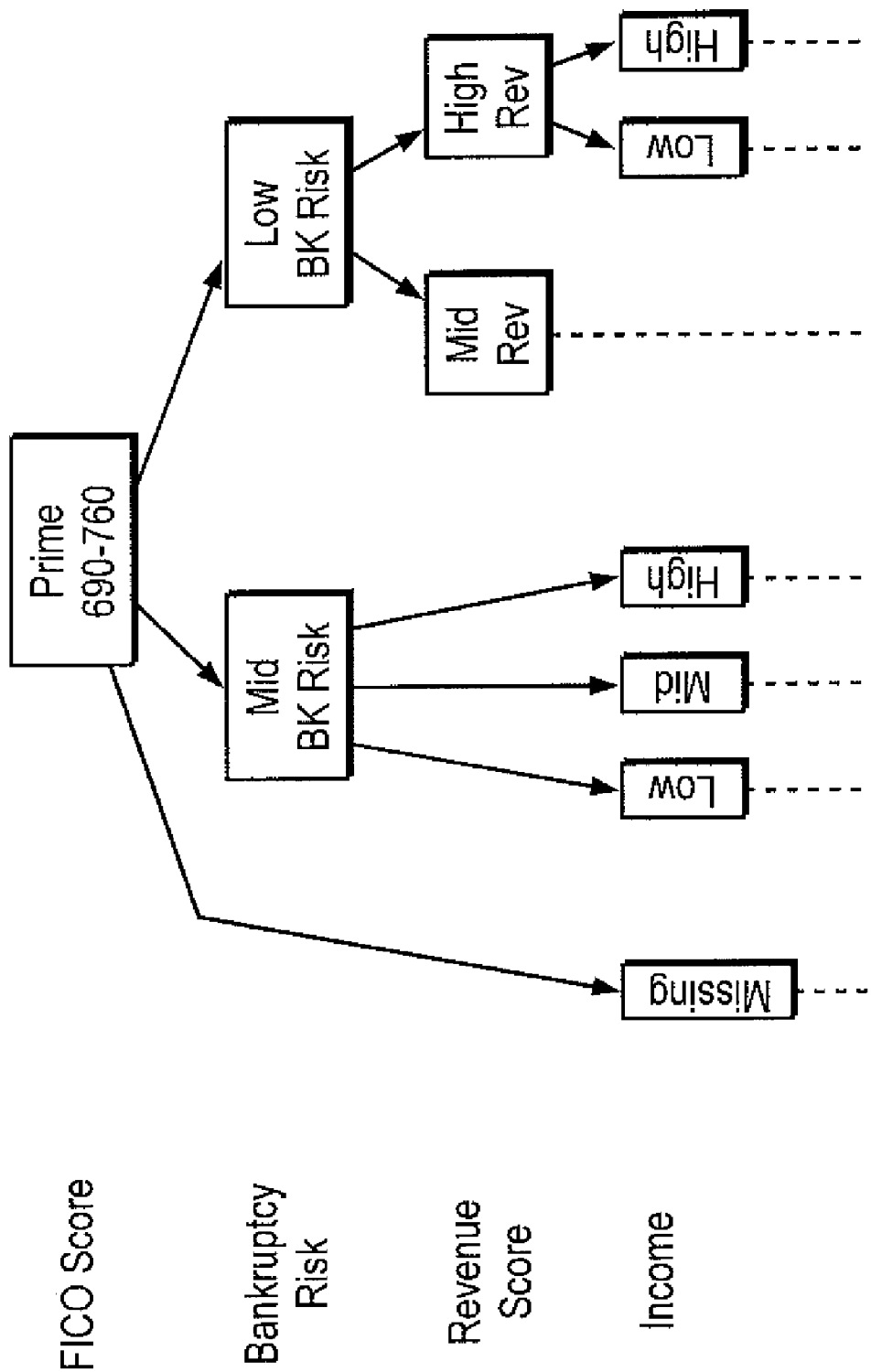
FIG. 21 is a block schematic diagram showing a multi-score, prime strategy using the capacity index.
Figure 22:
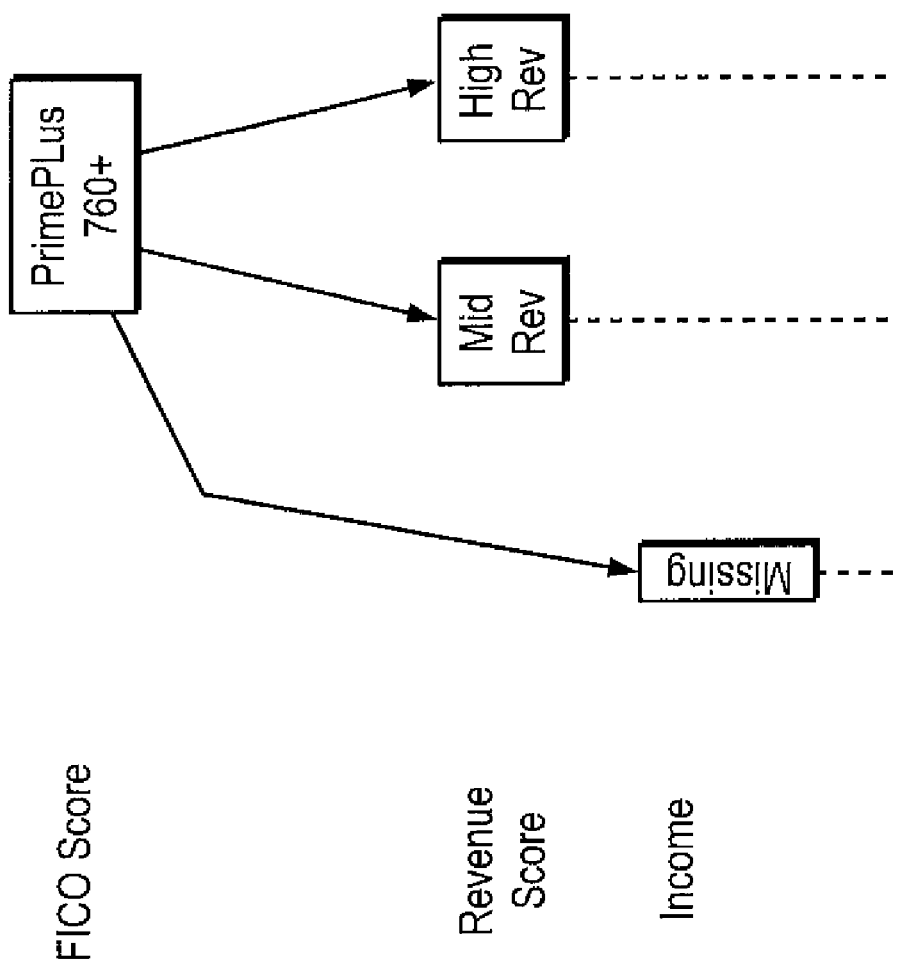
FIG. 22 is a block schematic diagram showing a multi-score, prime plus strategy using the capacity index.
Figure 23:
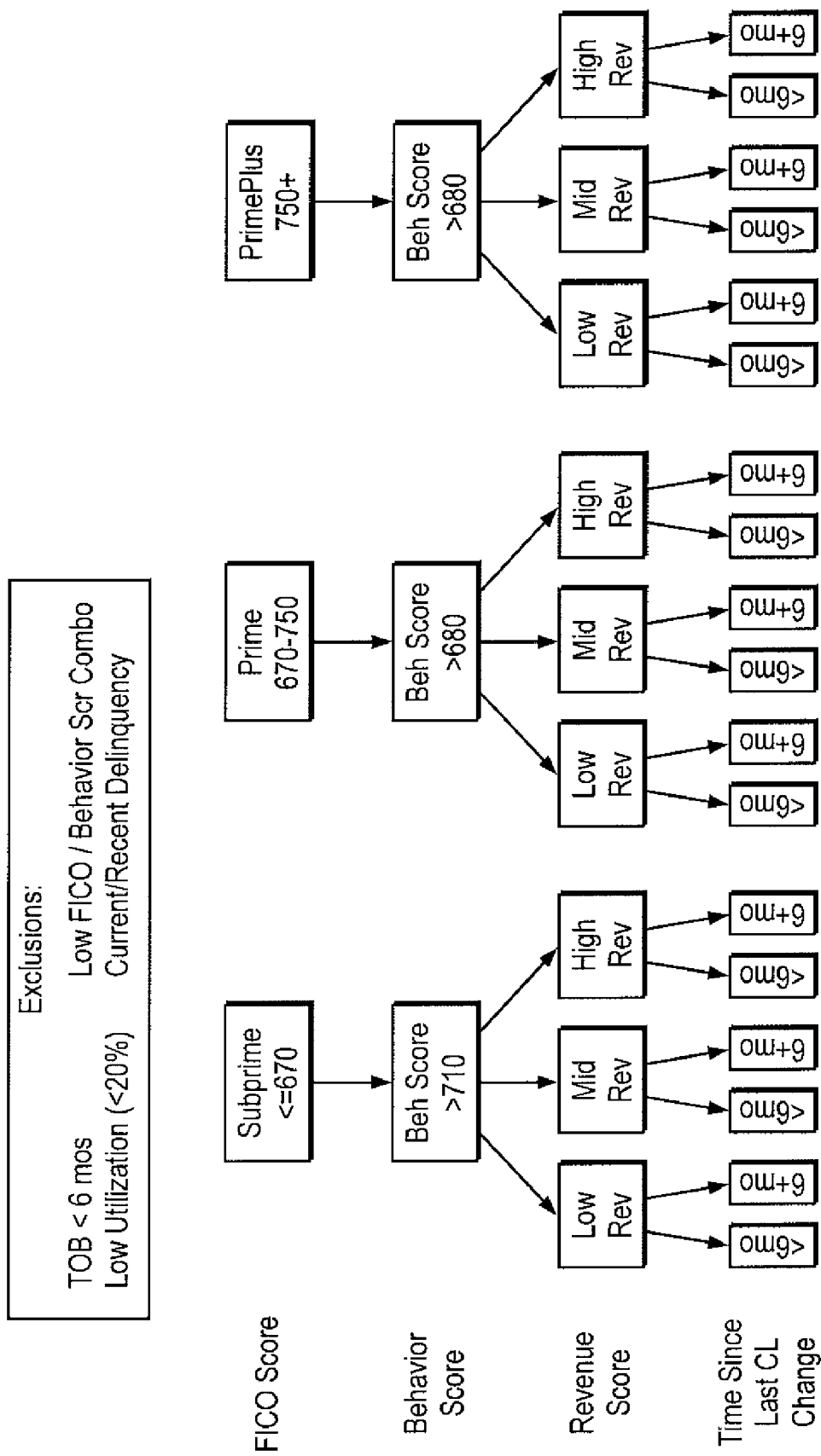
FIG. 23 is a block schematic diagram showing an account management strategy using the capacity index.

Further strategies are shown in the following figures, in which:

FIG. 19 is a block schematic diagram showing a multi-score account originations strategy using the capacity index; FIG. 20 is a block schematic diagram showing a multi-score, subprime originations strategy using the capacity index; FIG. 21 is a block schematic diagram showing a multi-score, prime originations strategy using the capacity index; FIG. 22 is a block schematic diagram showing a multi-score, prime plus originations strategy using the capacity index; and FIG. 23 is a block schematic diagram showing an account management strategy using the capacity index.

Other embodiments of the invention are applicable to other forms of consumer credit in an analogous fashion: bank cards, auto loans and mortgages, both for origination and account management.

In summary, in various incarnations of experiments, the capacity index has added value to studies including:
- new accounts for originations;
- existing accounts for account management;
- credit bureau and masterfile performance;
- pooled and individual lender bankcard portfolios;
- random samples of accounts;
- non-bankcard performance: auto loan, mortgage, and installment;
- on margin to simulated strategies; and
- on margin to FICO industry options.

The modeling approach described herein provides at least the following advantages:

The technology is not specific to data type, application, or performance definition; it can be applied to any simulatable forward-looking problem on any data source;

Performance, i.e. incremental balance weighted by good/bad, maps to capacity solutions more directly:
- it is able to demonstrate value on a tangible and intuitive performance definition;
- Direct modeling of capacity is more robust, and thus:
- leads to an optimized measure of capacity that rank orders saved bad dollars
- allows incorporation of new predictive variables;
- can be tuned to a lender's own decision space, portfolio, etc.;
- can also be used to develop broad-based solutions, including third party data providers for enhanced risk prediction.

Measuring consumer capacity is a critical business issue that has thus far been difficult to measure, partially due to the unavailability of non-truncated data, as a result of the ability of a large segment of the consumer population to exercise the discretion not to incur more debt than they can comfortably afford. Income is expected to continue providing information into strategy decisions involving consumer capacity to pay, however something more behavioral can be added by evaluating capacity to take on incremental debt.

The validation strategy results have shown how the capacity index better segments prospects or applicants to be targeted for different actions such as lower or higher lines, or increased or decreased pricing or fees.

As previously described, the methods and approaches herein described are preferably implemented by means of, for example, a data-processing system such as described with regard to FIG. 1. Alternatively, the methods and approaches herein described are implemented by means of, for example, a credit-scoring system.

The ordinarily-skilled practitioner will appreciate that various other computing arrangements are possible to support the functions described herein. For example, all or any portion of the functions may be combined as discrete software components or logic circuits on a single computing device such as a server. In other embodiments, functional elements may be distributed across a plurality of servers or other suitable computing devices in a variety of arrangements and configuration. All are within the scope of the invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense. One of ordinary skill will recognize that the foregoing examples are illustrative and are not intended to limit the invention.

The invention claimed is:

1. A computer-implemented method of predicting a capacity of a consumer to undertake incremental debt in the future, the method being implemented by one or more data processors and comprising:
   storing, by at least one data processor, computer-readable instructions which, when executed, implement a predictive model that simulates performance of the consumer in view of the incremental debt, the performance of the consumer determining the capacity of the consumer;
   inputting, to the predictive model and by at least one data processor, data representing a credit risk score and a credit report, the credit report comprising a plurality of prediction characteristics; and
   outputting, by at least one data processor of the predictive model, a capacity index that estimates said capacity of the consumer to undertake the incremental debt in the future without defaulting on the incremental debt;
   wherein the predictive model is generated by:
      selecting a sample population of accounts from a source population;
      for each account, generating, at beginning of a predetermined performance window, a first snapshot comprising a credit risk score for each member of the sample population and a plurality of prediction characteristics for each member of said sample population;
      for each account, determining, from a second snapshot generated at end of the predetermined performance window, performance of each member based on the undertaking of the incremental debt by the member at a predetermined time between the beginning and the end of the predetermined performance window, the performance being characterized as one of good and bad, the performance determining a capacity of the member such that a good performance represents a higher capacity that a lower capacity represented by bad performance;
      for each account, weighting the performance of each member by the incremental debt;
      for each account, generating a tag that expresses the performance of each member numerically;
      for all accounts in aggregate, by means of a software modeling tool, creating the predictive model that describes a relationship among the prediction characteristics for each member, the relationship rewarding good performance and penalizing bad performance such that accounts showing a high capacity are ranked higher than accounts showing low capacity; and
      for each account, adjusting said predictive model by subtracting said risk score from the tag, wherein a remainder of the subtraction comprises said capacity index.

2. The method of claim 1, further comprising the step of reporting said capacity index accompanied by reason codes.

3. The method of claim 1, wherein categories of said prediction characteristics include:
   an individual's payment history;
   amounts an individual owes on all accounts;
   length of credit history;
   new credit;
   mix of credit types total number of consumer's revolving credit cards;
the consumer's revolving balance; and
the consumer's credit limit.

4. The method of claim 1, further comprising the step of generating said prediction characteristics from consumer-level credit data, said credit data comprising any of:
income;
custom scores;
master file variables;
credit bureau data; and
other third-party data.

5. The method of claim 1, wherein said predictive model comprises a scorecard model that ranks orders consumers according to said capacity.

6. The method of claim 1, further comprising the step of:
generating said predictive model.

7. The method of claim 1, wherein said sample population is stratified, wherein one or more profile types likely to be under represented in a random sample are over sampled relative to said source population and wherein profile types are selectively weighted in a manner so that the weighted distribution of profile types mirrors the raw distribution of profile types in the source population.

8. The method of claim 1, wherein the performance is characterized as the good performance when the member does not default on the additional debt and the performance is characterized as the bad performance when the member defaults on the additional debt.

9. A non-transitory computer readable storage medium encoded with instructions, which when loaded into a digital computational device performs a method of predicting a capacity of a consumer to undertake incremental debt in the future, the method comprising:
generating a credit risk score and a plurality of prediction characteristics;
inputting said credit risk score and weights for each of said plurality of prediction characteristics to a predictive model that simulates performance of the consumer in view of the incremental debt, the predictive model being trained on historical performance data in a plurality of time periods following a credit scoring date;
outputting, by the predictive model, a capacity index that estimates said capacity of the consumer to undertake the incremental debt without defaulting on the incremental debt.

10. An apparatus for predicting a capacity of a consumer to undertake incremental debt in the future, comprising:
a computing device, said computing device comprising a processing component and a storage component; and
computer-readable instructions residing in said storage component which, when executed by said processing component instruct said processor to perform operations comprising:
generating a credit risk score and a credit report including a plurality of prediction characteristics;
inputting said credit risk score and said plurality of prediction characteristics to a predictive model that simulates a performance of the consumer in view of the incremental debt, the predictive model being trained using historical data from a plurality of customers, the historical data identifying a credit score, an intermediate consumer behavior performance period, and a subsequent consumer behavior performance period; and
outputting a capacity index that estimates a capacity of the consumer to undertake incremental debt without defaulting on the incremental debt, the capacity index characterizing how overall risk differs for consumers as a function of different levels of likely incremental debt that the consumers may undertake after the date of the generated credit risk score.

11. The apparatus of claim 10, said operations further comprising reporting said capacity index accompanied by reason codes.

12. The apparatus of claim 10, wherein categories of said prediction characteristics include:
an individual's payment history;
amounts an individual owes on all accounts;
length of credit history;
new credit;
mix of credit types
total number of consumer's revolving credit cards;
the consumer's revolving balance; and
the consumer's credit limit.

13. The apparatus of claim 10, said operations further comprising generating said prediction characteristics from consumer-level credit data, said credit data comprising any of:
income;
custom scores;
master file variables;
credit bureau data; and
other third-party data.

14. The apparatus of claim 10, wherein said predictive model comprises a scorecard model that ranks orders consumers according to said capacity.

15. The apparatus of claim 10, said operations further comprising:
generating said predictive model.

16. The apparatus of claim 15, wherein generating said predictive model comprises:
selecting a sample population of accounts from a source population;
for each account, generating, at beginning of a predetermined performance window, a first snapshot comprising a credit risk score for each member of the sample population and a plurality of prediction characteristics for each member of said sample population;
for each account, determining, from a second snapshot generated at end of the predetermined performance window, performance of each member based on the undertaking of the incremental debt by the member at a predetermined time between the beginning and the end of the predetermined performance window, the performance being characterized as one of good and bad, the performance determining a capacity of the member such that a good performance represents a higher capacity that a lower capacity represented by bad performance, the performance being characterized as the good performance when the member does not default on the additional debt and the performance is characterized as the bad performance when the member defaults on the additional debt;
for each account, weighting the performance by the incremental debt;
for each account, generating a tag that expresses the performance of each member numerically;
for all accounts, by means of a software modeling tool, creating the predictive model that describes a relationship among the prediction characteristics for each member, the relationship rewarding good performance and penalizing bad performance; and
for each account, adjusting said predictive model by subtracting said risk score from the tag such that remainder of the subtraction comprises said capacity index, the capacity index being indicative of the capacity such that accounts showing a higher capacity index are ranked higher than accounts showing a lower capacity index.

17. The apparatus of claim 16, wherein said sample population is stratified, wherein one or more profile types likely to be under represented in a random sample are over sampled relative to said source population and wherein profile types are selectively weighted in a manner so that the weighted distribution of profile types mirrors the raw distribution of profile types in the source population.

* * * * *